United States Patent
Kays et al.

(10) Patent No.: US 7,299,410 B2
(45) Date of Patent: Nov. 20, 2007

(54) SYSTEM AND METHOD FOR REPORTING HIERARCHICALLY ARRANGED DATA IN MARKUP LANGUAGE FORMATS

(75) Inventors: David Kays, Bellevue, WA (US); Ullattil Shaji, Sammamish, WA (US); William J. Whalen, Seattle, WA (US); Nick Carlson, Bothell, WA (US); Derek C. Y. Cheng, Issaquah, WA (US); Rhynier Myburgh, Bothell, WA (US); Rahul Gupta, Bellevue, WA (US); Kenik Hassel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 427 days.

(21) Appl. No.: 10/612,759

(22) Filed: Jul. 1, 2003

(65) Prior Publication Data

US 2005/0005233 A1    Jan. 6, 2005

(51) Int. Cl.
*G06F 5/00*    (2006.01)
(52) U.S. Cl. .................. 715/513; 715/500; 715/530
(58) Field of Classification Search ............. 715/513, 715/500, 517, 501.1, 530; 709/223, 227
See application file for complete search history.

(56) References Cited

U.S. PATENT DOCUMENTS

| | | | | |
|---|---|---|---|---|
| 6,389,589 B1 * | 5/2002 | Mishra et al. | ............... | 717/170 |
| 6,466,932 B1 * | 10/2002 | Dennis et al. | ................. | 707/3 |
| 6,578,192 B1 * | 6/2003 | Boehme et al. | ............. | 717/115 |
| 6,931,447 B1 * | 8/2005 | Hemstreet et al. | .......... | 709/227 |
| 2002/0035584 A1 * | 3/2002 | Scheier et al. | .............. | 707/517 |
| 2002/0095524 A1 * | 7/2002 | Sanghvi et al. | ............. | 709/318 |
| 2002/0178249 A1 * | 11/2002 | Prabakaran et al. | ........ | 709/223 |
| 2002/0184269 A1 * | 12/2002 | Imagou | ..................... | 707/523 |
| 2003/0041139 A1 * | 2/2003 | Beadles et al. | ............. | 709/223 |
| 2003/0126232 A1 * | 7/2003 | Mogul et al. | ............... | 709/219 |
| 2003/0154404 A1 * | 8/2003 | Beadles et al. | ............. | 713/201 |
| 2004/0003279 A1 * | 1/2004 | Beilinson et al. | ........... | 713/200 |
| 2004/0083453 A1 * | 4/2004 | Knight et al. | ............... | 717/113 |
| 2004/0107274 A1 * | 6/2004 | Mastrianni et al. | ......... | 709/223 |
| 2004/0110118 A1 * | 6/2004 | Clark et al. | .................. | 434/350 |
| 2004/0215649 A1 * | 10/2004 | Whalen et al. | ............. | 707/102 |
| 2004/0215797 A1 * | 10/2004 | Hadley | ....................... | 709/230 |
| 2005/0108627 A1 * | 5/2005 | Mireku | ........................ | 715/513 |
| 2006/0122937 A1 * | 6/2006 | Gatto et al. | ................... | 705/51 |

* cited by examiner

*Primary Examiner*—Stephen Hong
*Assistant Examiner*—Thu Huynh

(57) ABSTRACT

A system and method comprising a reporting mechanism for outputting an HMTL and XML document from a collection of hierarchically maintained settings such as group policy object settings or resultant set of policy data. The reporting mechanism provides a substantially complete view of which settings are configured (enabled) in a given group policy object, or a view for a resultant set of policy (that is applied to a given SOM), along with the values of the settings. The markup language format enables viewing a flat representation of the settings, and printing, saving and/or transporting of the settings. XML schemas describe a valid representation of group policy settings, and a valid representation of resultant set of policy.

17 Claims, 18 Drawing Sheets

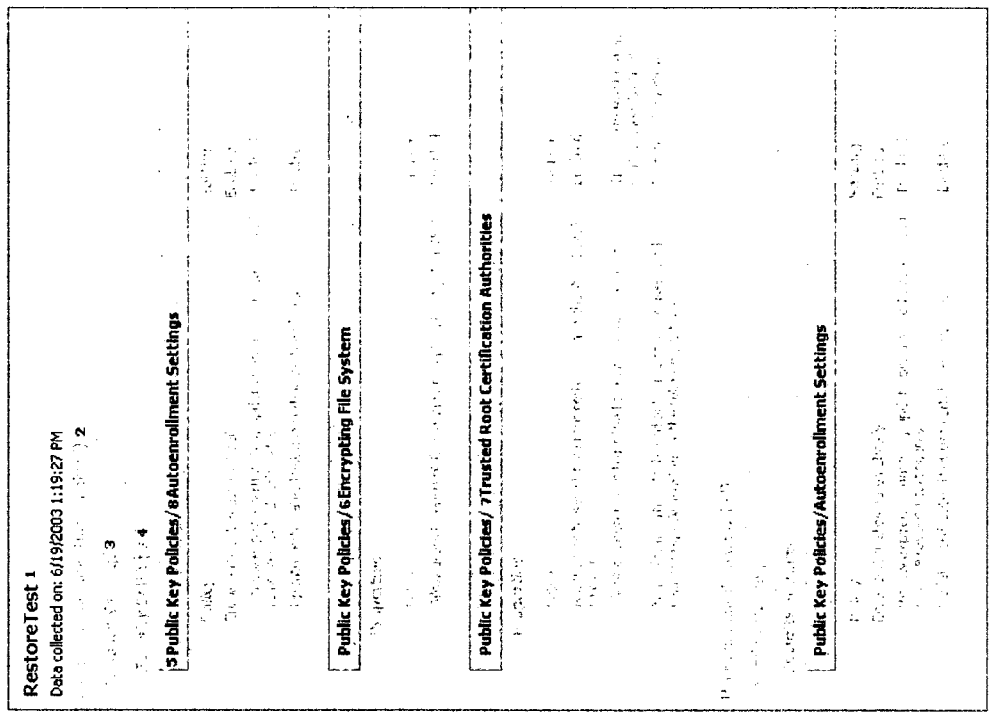
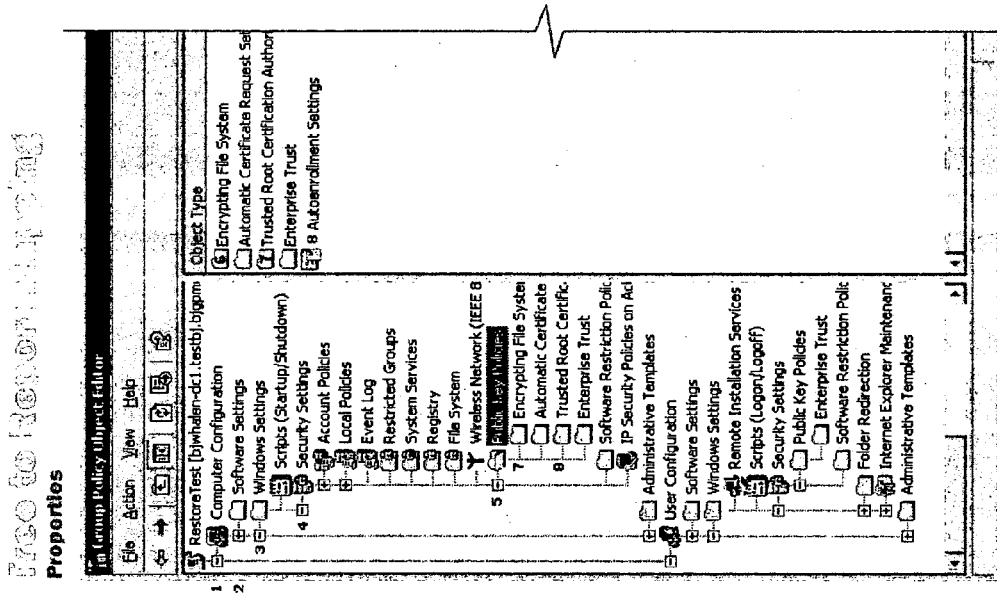
FIG. 7

Settings

RestoreTest
Data collected on: 6/19/2003 1:19:27 PM

Public Key Policies/ Autoenrollment Settings

| Policy | Setting |
|---|---|
| Enroll certificates automatically | Enabled |
| Renew expired certificates, update pending certificates, and remove revoked certificates | Disabled |
| Update certificates that use certificate templates | Disabled |

Public Key Policies/ Encrypting File System

Properties

| Policy | Setting |
|---|---|
| Allow users to encrypt files using Encrypting File System (EFS) | Enabled |

Public Key Policies/ Trusted Root Certification Authorities

Properties

| Policy | Setting |
|---|---|
| Allow users to select new root certification authorities (CAs) to trust | Enabled |
| Client computers can trust the following certificate stores | Third-Party Root Certificati Certification Authorities |
| To perform certificate-based authentication of users and computers, CAs must meet the following criteria | Registered in Active Directc |

User Configuration (Enabled)

Windows Settings

Security Settings

Public Key Policies/Autoenrollment Settings

| Policy | Setting |
|---|---|
| Enroll certificates automatically | Enabled |
| Renew expired certificates, update pending certificates, and remove revoked certificates | Disabled |
| Update certificates that use certificate templates | Disabled |

Settings

*FIG. 8*

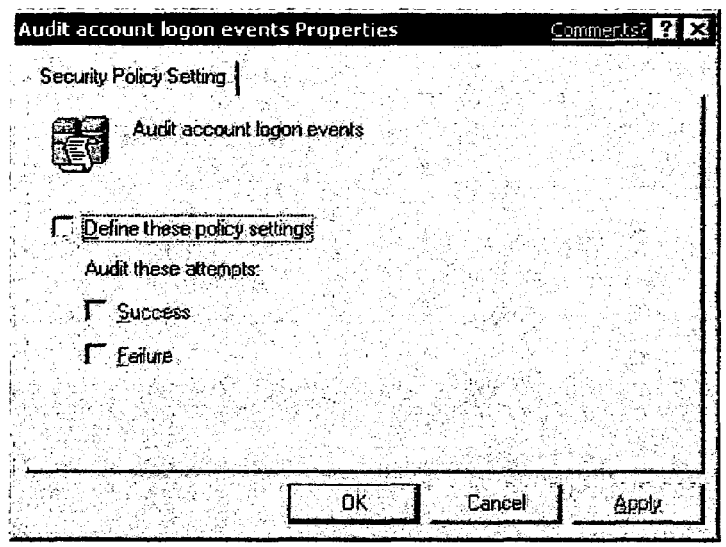
| Local Policies/Audit Policy | |
|---|---|
| Policy | Setting |
| Audit account logon events | Success |
FIG. 9

| Local Policies/Audit Policy | |
|---|---|
| Policy | Setting |
| Audit account logon events | Success |
| Audit account management | No auditing |
| Audit directory service access | No auditing |

FIG. 13
*Prior Art*

Local Policies/Security Options

Microsoft network server

| Policy | Security Setting |
|---|---|
| Amount of idle time required before suspending session | 10 minutes |

Network access

| Policy | Security Setting |
|---|---|
| Network access: Shares hat can be accessed anonymously | COMCFG; DFS$ |

Network security

| Policy | Security Setting |
|---|---|
| Minimum session security for NTLM SSP based (including secure RPC clients) | Enabled |
| Require message integrity | Enabled |
| Require message confidentiality | Disabled |
| Require NTLMv@ session security | Disabled |
| Require 128-bit encryption | Disabled |
| Minimum session security for NTLM SSP based (including secure RPC servers) | Enabled |
| Require message integrity | Enabled |
| Require message confidentiality | Disabled |
| Require NTLMv@ session security | Disabled |
| Require 128-bit encryption | Disabled |

System objects: Strengthen default permissions of internal system objects

| Policy | Security Setting |
|---|---|
| Strengthen default permissions of internal system objects | Enabled |

System objects

| Policy | Security Setting |
|---|---|
| Default owner for objects created by members of Administrators group | Administrators Group |

*FIG. 14*

SYSTEM AND METHOD FOR REPORTING HIERARCHICALLY ARRANGED DATA IN MARKUP LANGUAGE FORMATS

This application incorporates by reference the contents of a CD-ROM which contains the Computer Program Listing Appendix and includes a 105 kB file labeled Appendix A, a 68.1 kB file labeled Appendix B, a 130 kB file labeled Appendix C, and a 118 kB file labeled Appendix D. The CD-ROM was created on Jul. 17, 2007.

CROSS-REFERENCE TO RELATED APPLICATIONS

The present invention is related to the following U.S. patent applications: Ser. No. 10/410,887 entitled "Support Mechanisms for Improved Group Policy Management User Interface," Ser. No. 10/410,883 entitled "Method and System for Representing Group Policy Object Topology and Relationships," Ser. No. 10/410,865 entitled "Method and System for Implementing Group Policy Operations," and Ser. No. 10/411,876 entitled "Interfaces and Methods for Group Policy Management." Each related application is assigned to the assignee of the present patent application and hereby incorporated by reference in its entirety.

COPYRIGHT DISCLAIMER

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The invention relates generally to computer systems and networks, and more particularly to policies used in computer networks.

BACKGROUND OF THE INVENTION

In contemporary computing networks, network administrators define policies for users and computer systems of that network. With a Microsoft Windows®-based operating system, administrators use Group Policy technology to define the state of users' work environment, and rely on the system to enforce the defined policies. In general, those policies are then applied to determine how the various computer systems are configured. For example, the configuration that a user sees when logged onto any computer system of the network depends on the policy settings for that machine combined with the policy settings for that user.

In such a network, Group Policy can be used to specify many of the settings for a user and computer, including registry-based policy settings used to configure and specify behavior of the operating system and optionally application programs based on settings in various computer systems' registries, and script-related policy settings that control scripts for computer startup and shutdown, and user logon and logoff. Group policy can also specify particular software programs for groups of users and/or machines, as Group Policy includes settings for centrally managing the installation, updates, and removal of application programs and components. Security options are also provided by policy settings, e.g., for local computer, domain, and network security settings. Folder redirection options, which allow administrators to redirect users' special folders to the network, also may be managed via Group Policy, as can Internet Explorer Maintenance, which is used to manage settings related to Internet Explorer and Remote Installation Services options, which are used to manage client configuration options that users see when performing Remote Installation Services-based installs. Internet Protocol Security Settings and Wireless settings can also be deployed through Group Policy, and public key policy settings, as well as software restriction policies can also be managed.

To apply and enforce the policy in a Windows®-based operating system, the Group Policy settings that administrators create are contained in group policy objects (GPOs). In general, a group policy object may be considered a collection of settings of various types, defined by extensions to group policy which are registered on the administrative and client systems and used to manage group policy configuration. The actual application of settings on the client, as well as administration of settings is managed by that extension. Group policy objects are applied to one or more scopes of management, such as a site, domain, or organizational unit (OU) in Active Directory®, and thus a site, domain, or organizational unit may also be referred to as a scope of management, or SOM. In this manner, administrators centrally apply policy to users and computers of those sites, domains, and organizational units. Policy settings from group policy objects that are linked to each of these different hierarchical levels are combined and applied to the policy recipients. Any conflicting policy among the levels is resolved via various rules, as generally described in U.S. Pat. No. 6,466,932, herein incorporated by reference. The result set is referred to as a resultant set of policy, or RSoP, which comprises the policy settings that were applied to a user or computer, as well as the group policy objects from where these settings originated (the winning GPO).

While group policy is a very powerful technology and group policy objects greatly simplify network administration, group policy objects are not simple objects, but rather virtual objects comprising complex pieces of setting definitions that are stored on the domain. In general, each group policy object comprises multiple subcomponents, typically including a collection of many files, other objects and attributes, that reference one another in various ways. For example, in one Windows®-based implementation, a group policy object comprises some settings stored within an Active Directory® container, as well as in a file system directory (sysvol) on the domain controllers within the group policy object's host domain.

Managing Group Policy in an enterprise environment requires an understanding multiple complex sets of data, simultaneously. For example, to understand which computers and users will receive and apply the settings in a given group policy object, the administrator has to access and understand multiple sets of information. In addition, multiple group policy objects can apply to a single user and/or a computer. To manage this complexity and understand the relationships of group policy objects and the directory, an MMC snap-in, the Group Policy Management Console, is provided. This snap-in allows the administrator to work with group policy objects as a unit.

However, a group policy object is a collection of multiple settings. To edit and configure those settings within a single group policy object, a second Microsoft Management Console (MMC) Snap-in, Group Policy Object Editor (GPEdit) is provided, which (for convenience) is launchable from the Group Policy Management Console. With GPEdit, the group policy object is displayed hierarchically on a left side (pane), with details for a selected item in displayed on a right side (pane).

However, in part because of the restrictive view in which this is presented and controlled through MMC snap-ins, it is very difficult to administer a group policy object's settings. More particularly, the snap-in view generally restricts the administrator to viewing a small number of settings at a time, since the settings are organized within a folder structure, and thus makes it very difficult to determine what settings are configured. For example, there are a large number of settings in a group policy object or resultant set of policy for a policy recipient, on the order of one-thousand, however typically only a few (e.g., ten to twenty) may be configured for a given user. The administrator may need to manage these settings, but does not know which of the many settings are enabled. To determine which are enabled, the administrator has to navigate through a large hierarchy of settings. Further, the displayed data is limited to the snap-in environment and requires connectivity to the domain, and, for example, cannot be exported into a form usable by other programs, nor can it be printed. One further drawback of viewing settings in an editing program is that the viewer needs to have write access to the group policy object.

SUMMARY OF THE INVENTION

Briefly, the present invention provides a system and method comprising a reporting mechanism that outputs a collection of hierarchically maintained settings as one or more markup language documents, for example an XML and/or HTML document. Because of the nature of these markup language formats, the subsequent processing makes it straightforward to operate on the data for reporting purposes. For example, the XML format enables further manipulations and queries, while the HTML format comprises a standardized format that can be rendered into human readable form by a web browser or other types of document viewers and editors.

When used in the Group Policy Management Console in MMC, the reporting mechanism enables a collection of group policy settings to be viewed, printed or otherwise processed from the markup language documents. When rendered on a viewer, the mechanism provides a substantially complete view of which settings are configured (enabled) in a given group policy object, or a view for a resultant set of policy (that is applied to a given SOM or a specific user or computer), along with the values of the settings.

Various mapping rules are provided to convert the hierarchically arranged settings data, including data previously accessible through property dialogs accessed from a treeview, into an HTML representation of the settings. The HTML representation may be expanded and contracted in an interactive manner as desired by a user, to quickly navigate to view desired settings. Read-only access is sufficient to view and interact with the HTML document.

To facilitate the output of the data related to group policy, the present invention includes two XML schemas, one describing a valid representation of group policy settings, and the other describing a valid representation of resultant set of policy. The schemas provide a foundation for further processing of the XML view of group policy data. Group policy objects as well as resultant set of policy data can be represented in XML and HTML.

In one implementation, an architecture is provided to collect group policy object settings, and translate or serialize those settings into output markup language documents, based on .net objects and XML schemas. For group policy objects, a group policy object read and translate mechanism reads the settings for a group policy object, comprising a combination of directory service settings and sysvol settings. A reporting mechanism, such as implemented in a single .net assembly, uses mapping information to persist the settings into an HTML representation, and may use a localized string table to render the group policy object's HTML representation output in an appropriate language. The reporting mechanism also leverages an XML serializer to persist the settings into an XML document. RSoP settings are similarly processed, e.g., by initializing the various net class objects from a WMI repository, translating into HTML and serializing into XML.

In sum, by reading the group policy object settings from their disparate (e.g., DS and sysvol) component locations, or by reading settings from a WMI namespace, an XML document which conforms to the corresponding group policy object schema or RSoP schema, as appropriate, may be produced by utilizing an XML serializer. For generating HTML documents, the group policy object and RSoP root elements, as well as each extension, implement an appropriate method for persisting their settings into a statically defined HTML format with which a viewer can interact.

Other advantages will become apparent from the following detailed description when taken in conjunction with the drawings, in which:

BRIEF DESCRIPTION OF THE DRAWINGS

FIGS. 6 and 7 are example representations exemplifying the mapping of data as viewed with a group policy object editor versus when viewed in a rendered HTML document, in accordance with an aspect of the present invention;

FIG. 8 is a representation of how the settings of a single group policy object may be displayed when rendered from an HTML document and shown under an expanded heading, in accordance with an aspect of the present invention;

FIG. 9 is a representation of how a property dialog maps to an HTML representation, in accordance with an aspect of the present invention;

FIG. 10 is an HTML representation displaying multiple sets of settings data for a group policy object, in accordance with an aspect of the present invention;

FIGS. 12 and 13 are representations of dialogs as presented in the prior art;

FIG. 14 is an example representation of a rendered HTML document showing settings displayed for a group policy object, in accordance with an aspect of the present invention;

DETAILED DESCRIPTION

Exemplary Operating Environment

Figure 1:
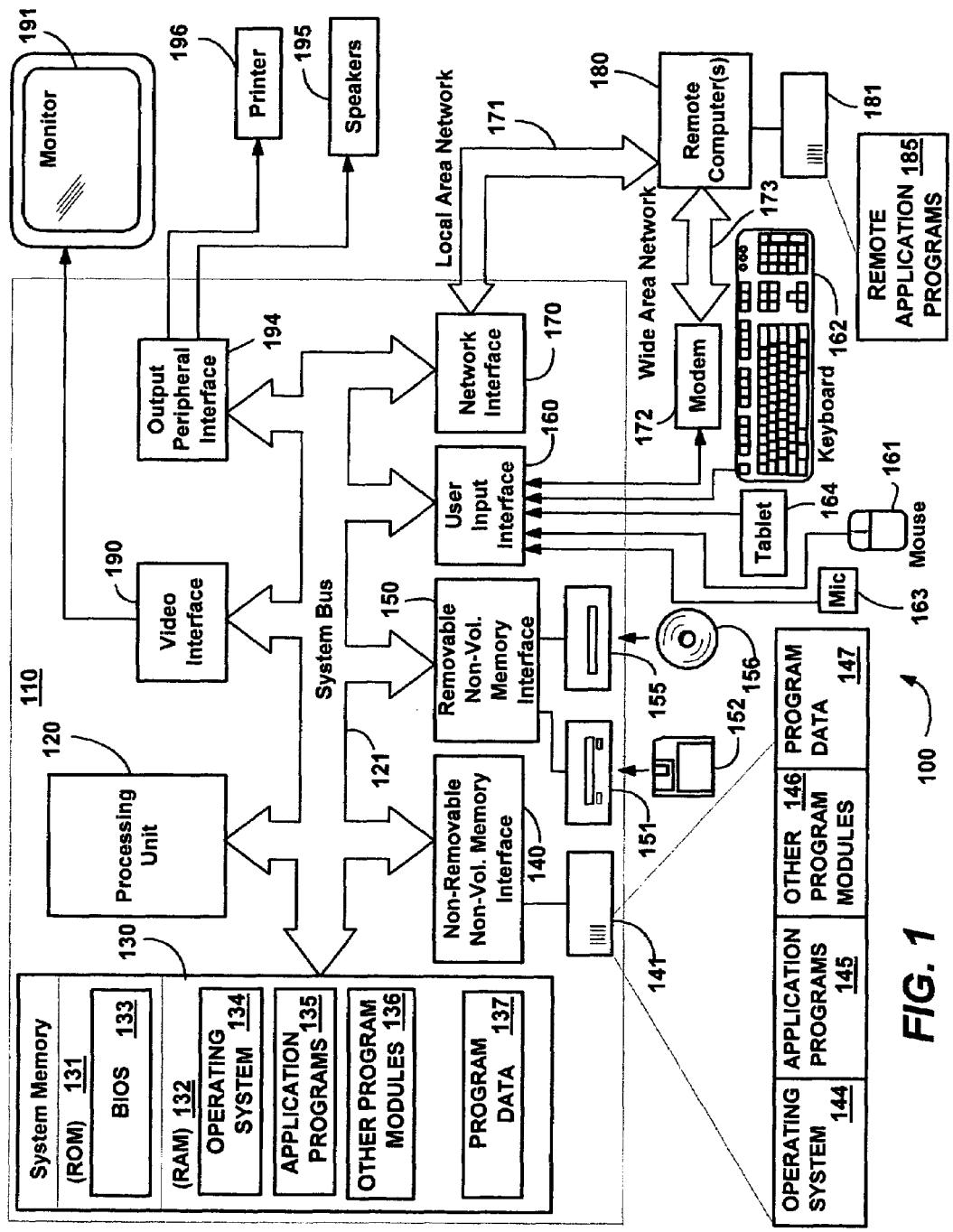
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA), Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Group Policy Objects

In general, the present invention provides a method and system for operating on policies implemented throughout a network, wherein those policies are defined and arranged (e.g., by one or more administrators) into group policy objects. Group policy objects generally comprise a collection of files, objects and attributes that exist at various locations in the network. Such policy may correspond to policy settings in the group policy objects, including registry-based settings, scripts, (computer startup and shutdown scripts, and user logon and logoff scripts), redirection of folders that contain user documents and settings, application deployment (software installation), security settings, public key policy settings, software restriction policies, IP security, remote installation services, and/or Internet Explorer Maintenance. Indeed, group policy objects may be extended to include virtually any desired information, as long as a client-side (or other) extension that uses the policy object is capable of interpreting and/or handling the information therein.

In an example implementation described herein, the system and method of operating on group policy utilize a highly flexible architecture of the Microsoft Windows® operating system, in which an administrator links the group policy objects to the containers, which comprise hierarchically organized directory objects representing sites, domains and organizational units, with policy recipients (e.g., users and computers) being associated with those containers. In this implementation, generally represented in FIG. 2, the group policy objects preferably utilize a Windows® directory service (e.g., in components 201 and 202), known as Active Directory®, which stores information about the objects of a domain, and makes this information easy for administrators to access, find and apply via a single, consistent and open set of interfaces. Note that each domain controller has a directory service component, with data replicated to other directory service components, but for purposes of the examples the directory service will be described with reference to the directory service component 202. Thus, for example, with the Active Directory® service 202, administrators can access resources anywhere on the network. Similarly, administrators have a single point of administration for the objects on the network, which can be viewed in a hierarchical structure. Each domain controller also has a sysvol component (that is, a distributed file system component, networked file system component, file storage component or the like) that is similarly replicated, typically for maintaining larger sets of data (relative to the size of the sets of data in the directory service). Note that for purposes of explanation herein, the user performing such group policy object-related tasks will be referred to as an administrator, although it is understood that any user with appropriate security privileges can perform these tasks, even if not actually designated as an administrator.

Figure 2:
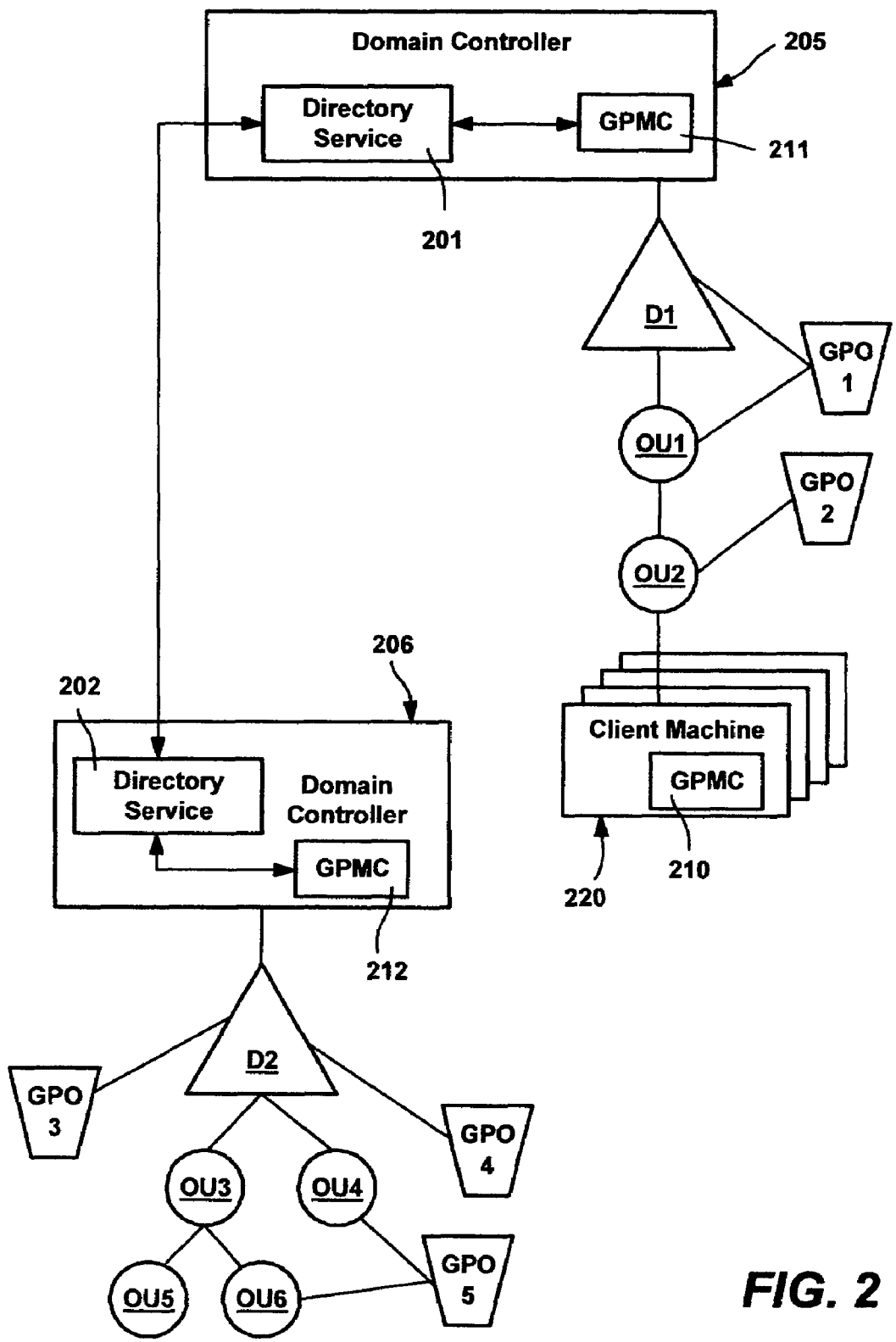
FIG. 2 is a block diagram generally representing a network including a directory service and domain controllers with group policy objects capable of being reported on in accordance with an aspect of the present invention.
Figure 3:
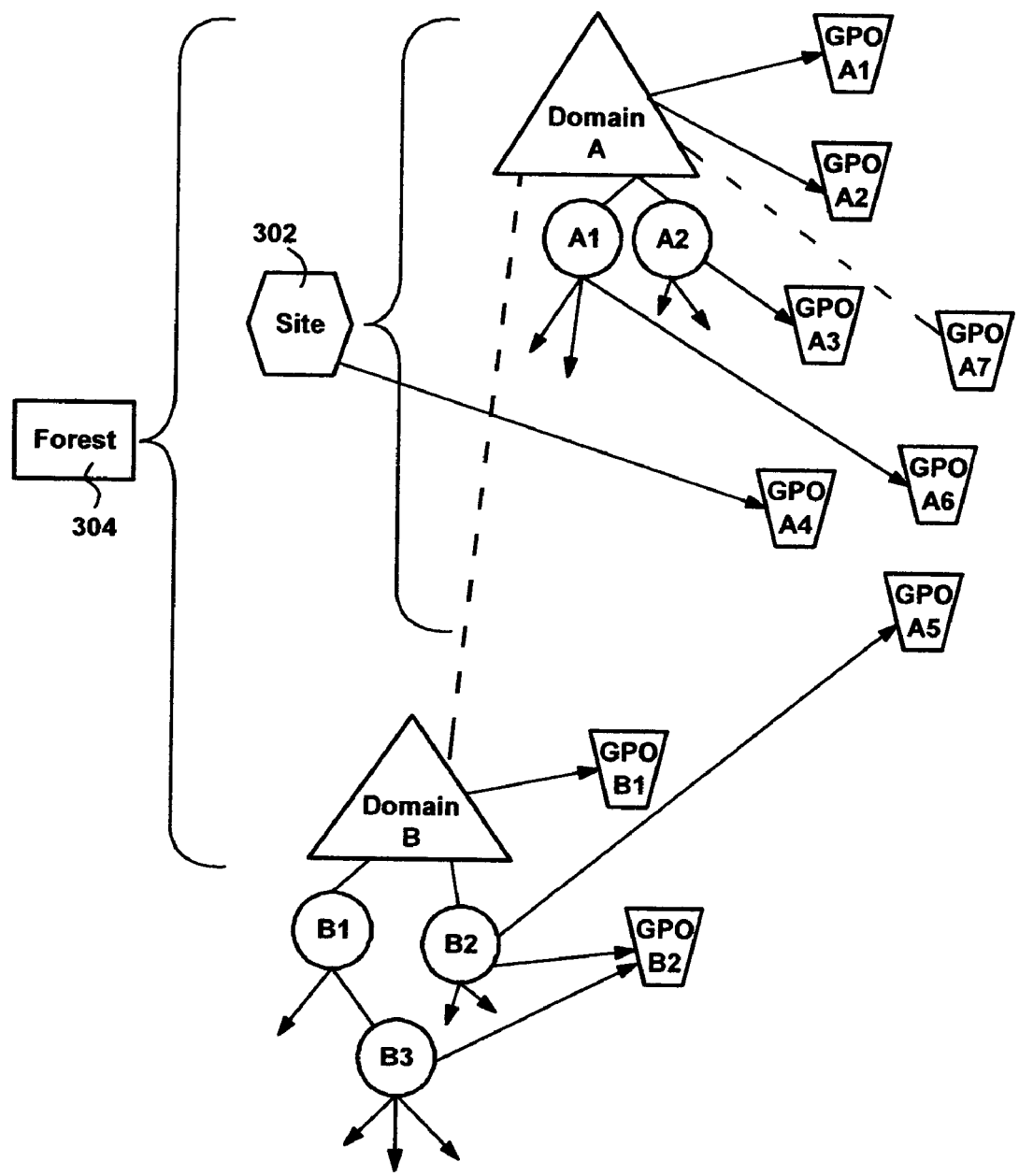
FIG. 3 is a representation of a forest, site, domains and organizational units in network with associated group policy objects capable of being reported on in accordance with an aspect of the present invention.

A core unit in the Active Directory® service is a domain, shown via domains D1 and D2 in FIG. 2, which are each controlled by one or more domain controllers, shown as the domain controller 205 and the domain controller 206, respectively. Note that there may be more than one domain controller per domain. Many of the objects of a network exist within a domain. As generally represented in FIG. 3, a single domain can span multiple physical locations or sites (e.g., 302), and domains can be grouped together into a forest 304, typically in some logical grouping as determined by an administrator. A site 302 comprises one or more ranges of IP addresses of which computers can be a member, often a grouping of computers related by some geographical area.

Organizational units (e.g., OU1-OU6 in FIG. 2) are a type of directory object included within domains that are hierarchically organized logical containers into which users, groups, computers, and even other organizational units may be logically placed. Group policy objects e.g., GP1-GP5 in FIG. 2) are stored in (exist in) a domain, and can be applied to one or more sites, domains, and/or organizational units. Note that a site, domain, and/or organizational unit may be referred to as a scope of management, or SOM. It will be readily appreciated that although described herein with reference to Microsoft Windows®, the Active Directory® service, sites, domains, organizational units, and so forth, the present invention is not limited thereto, nor even to directory containers in general, but rather is applicable to any types of policy objects and/or scoping mechanisms that require management in a network.

To apply policy to policy recipients (users and machines) of the network, group policy objects may be created via a Group Policy Management Console (e.g., 210, 211 or 212 in FIG. 2), or similar program with a suitable user and/or programmatic interface. Note that as represented in FIG. 2, an instance of the Group Policy Management Console may be run from essentially any machine in the network that is capable of running a management program, including client machines (e.g., 220) or the domain controllers 205 and 206. Once created, group policy objects may then be linked to an appropriate container or containers (e.g., objects representing a scope of management, such as sites, domains and organizational units) that are arranged in a hierarchy with which the policy recipients are associated. For example, any Group Policy Management Console 210, 211, 212 or similar user interface tool allows administrators to selectively associate the group policy objects GPO1 and GPO2 with directory container objects D1, OU1 and OU2 in FIG. 2. Note that as represented by the dashed line from Domain A to the group policy object GPOA7 in FIG. 3, a group policy object may exist in a domain but not be linked to a container.

Each group policy object (e.g., GPO3 of FIG. 2) may be composed of group policy information maintained in many locations in the network, including objects and attributes stored in the Active Directory® service 202, and collections of system volume (sysvol) files, wherein the sysvol comprises a folder on a domain controller (e.g., 206), such as used to replicate file-based data among domain controllers. The policy information may include one or more pointers to another location (e.g., a data file on a remote share) where some or all of the actual policy information (or a further pointer thereto) is maintained. Policy information also may be stored in a virtual registry (e.g., a copy of some or all of a client machine's registry maintained in a file on the server, specifically in the group policy template), that may be used by an extension to put information into the client-machine's registry.

Because many group policy objects can apply to one policy recipient, such as via a domain association or one or more organizational units to which the policy recipient belongs, for each policy recipient, the policy settings maintained in the policy objects may be selectively accumulated in an order of precedence, inherited from the group policy objects associated with one or more higher-up organizational units, a site, and/or the domain, and/or blocked from being inherited. In general, to accumulate policy for a policy recipient, policies are applied in a manner such higher policies that are enforced take precedence by hierarchical order, while higher non-enforced policies may be overridden by lower-level policies.

Reporting Hierarchically Arranged Data

The Group Policy Management Console, in conjunction with a Microsoft® Management Console (MMC), for example, provides a mechanism for representing and managing group policy objects and relationships among various aspects of group policy-related data. Note that the Group Policy Management Console can be configured to operate in other environments, however one reason that the Group Policy Management Console was incorporated into the MMC environment is to be grouped with other MMC tools that may be appropriate to the administrator's overall tasks. The Group Policy Management Console 212 provides this group policy representation and management functionality in a number of ways, including by providing a user interface and underlying logic for managing group policy. For example, from a single unified view, an administrator can view, manage, and search across domains, sites, and even forests, copy group policy objects and import data to group policy objects, and so forth, as generally described in the aforementioned patent applications, Ser. Nos. 10/410,887; 10/410,883; 10/410,865; and 10/411,876.

As will be understood, however, the present invention is more general, and applies to programs items other than the Group Policy Management Console, in that the present invention may be adapted to represent, in a straightforward, intuitive, and easy to use report format, (wherein reporting refers to viewing, transmitting, persisting, printing and so forth) any content that is capable of being displayed in the MMC or similar programs which use a tree structure on one (e.g., left) pane and a varied, disparate, and rich user interface on another (e.g., right) pane. Thus, although the examples herein will primarily be described with reference to group policy objects and resultant set of policy data, as well as an MMC environment, it is understood that the present invention may be implemented with virtually any hierarchical arrangement of data such as in MMC, in which an HTML and/or XML report is desired. Note that the HTML document may be rendered by any contemporary browser, not just in an MMC environment such as hosting the Group Policy Management Console snap-in.

Figure 4:
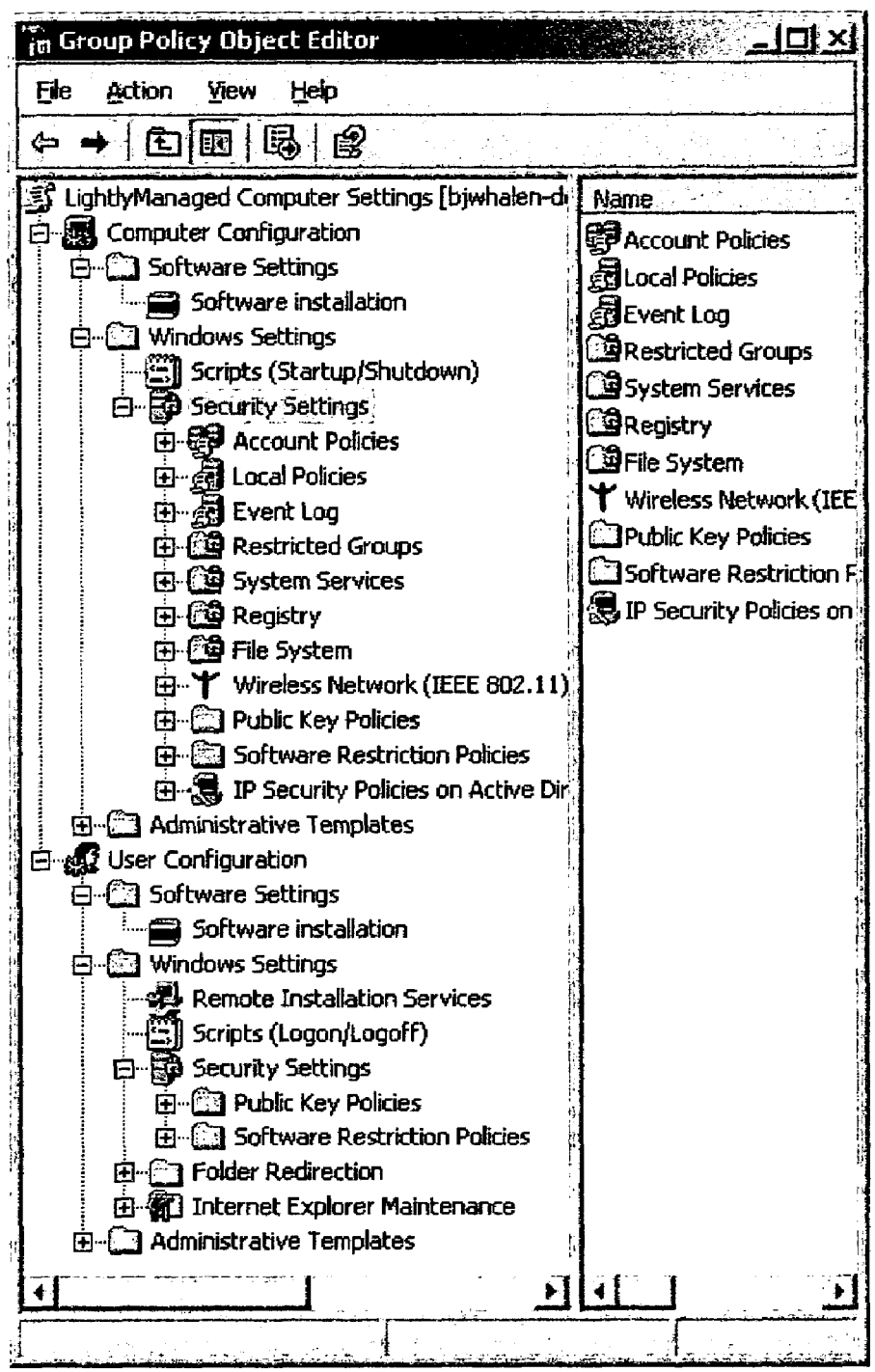
FIG. 4 is a representation of a program display that allowed settings to be viewed and located, in the prior art.

FIG. 4 shows a prior way in which group policy objects were managed in an MMC environment, namely by a group policy object editor (GPEdit) MMC snap-in program. In FIG. 4, a single group policy object was generally displayed as a tree on the left side, and the policy settings located by navigating the tree and expanding and collapsing the nodes to locate a particular setting among the full set of enabled, disabled and not configured settings. In this GPEdit snap-in, a node is selected via expansion and navigation, and the next level of information under that selected node (e.g., subnodes or setting data) is shown in the right side. Eventually, the administrator selects a leaf node corresponding to a policy that can have a setting. The policy might or might not be enabled for that group policy object; if enabled, the right side pane displays the setting's data. However, many of the policies in a given group policy object are often not configured, and thus as can be readily appreciated, an administrator has to perform a significant amount of navigation to view the various settings for a group policy object, which is considerably time-consuming and tedious.

Figure 5:
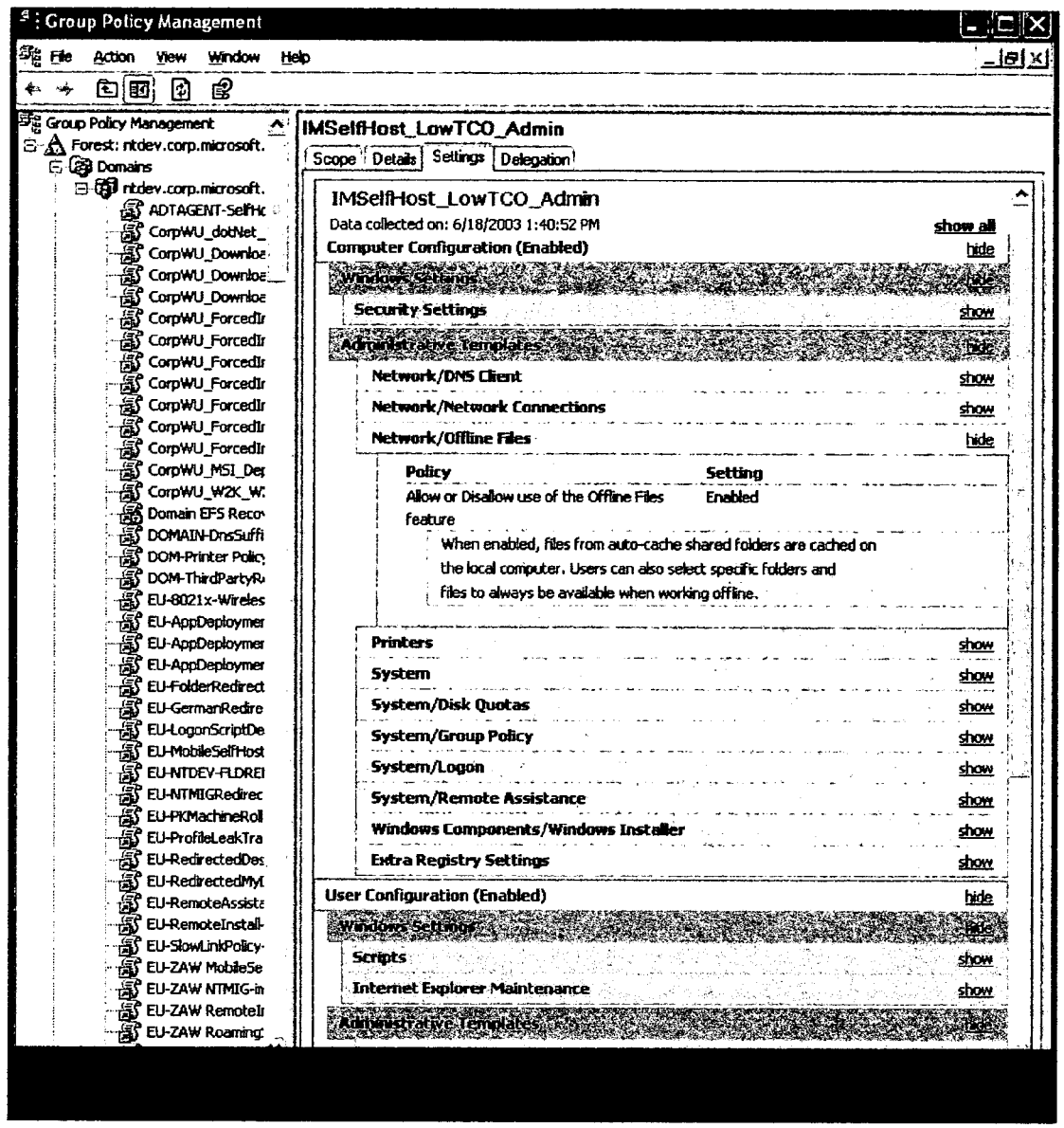
FIG. 5 is a representation of a view of the settings of an example group policy object when rendered from an HTML document output by a reporting mechanism in accordance with an aspect of the present invention.

In accordance with an aspect of the present invention, there is created an HTML document, that when rendered on a rendering engine (e.g., in a browser or the like), provides an interactive expandable and collapsible view of the settings data corresponding to an item in one part (e.g., the left side) of the console, such as a view of the settings data for a group policy object, or a view of a resultant set of policy report. As represented in FIG. 5, in an example MMC environment with a Group Policy Management Console snap-in, multiple group policy objects are displayed in a tree view in a left pane, while the HTML document is rendered and made interactive (navigable) in a right pane.

In keeping with an aspect of the present invention, when a settings tab is selected, (which initially may be selected by default upon selection of a group policy object in the tree), only the configured settings of that selected group policy object are presented in the right pane. This eliminates the need for an administrator to have to navigate over significant numbers of not configured settings (e.g., presently on the order of one-thousand) to view the settings of a group policy object. Note that as used herein, an administrator can be any user having rights to access the group policy object. However, unlike the GPEdit program (FIG. 4) which required that the user have read-write access to a group policy object, the rights required to view a report for a group policy object also can be read-only, allowing an administrator to delegate some group policy object tasks to a read-only level user, thereby ensuring that a delegated task can be performed without the group policy object being changed.

In general, when any group policy object is selected in the left pane, an HTML report document may be created as described below, and rendered such that the user sees a representation of the HTML document in the right pane (with the settings tab active). The administrator then interacts with the right pane by clicking on any of the displayed bars, causing the display to toggle between showing and hiding various levels of a hierarchical structure that corresponds to the group policy object's structure, down to the settings data itself. In other words, the administrator navigates the right pane simply by scrolling as desired and clicking on any bar, expanding and contracting the sublevels (secondary sections) until the desired data for a setting (or settings) is displayed. Although not readily apparent from FIG. 4, the colors have been chosen for good contrast and clear viewing in general.

In one implementation, the layout of the document has a structure that closely maps the structure of the left hierarchical pane in the prior Group Policy Object Editor (GPEdit) program (FIG. 4), so that a user familiar with that program and MMC can easily understand a particular setting and its relationship to other settings when the document is rendered. To this end, as described below, the contents of the right pane in GPEdit, which may vary substantially such as due to many property pages and/or a deep level of multiple dialogs, are mapped into an HTML report in accordance with the present invention that is then displayable, such as by a browser or in the right pane of the group policy management console. As mentioned above, in this implementation only the configured settings are present in the displayed report.

In one implementation, there are two forms of the HTML report, including a version for viewing that is shown in the user interface of the group policy management console, such as on the "Settings" tab of FIG. 5. This report maps to the namespace in GPEdit (represented in FIG. 4), and has two primary sections, namely "User Configuration" and "Computer Configuration" sections, as shown in FIG. 5.

Another form (version) of the HTML report is available for printing or saving the report to a file. This printing/saving version contains the data of the viewing version (e.g. the GPEdit content), plus additional data about the group policy object that is not displayed, but useful to an administrator in understanding the group policy object. In this implementation, the printing/saving version has three primary sections, the aforementioned "User Configuration" and "Computer Configuration" sections, plus a "General" section. The "General section" provides the contents of what appears in the user interface on the other tabs (that is, not the "Settings" tab), including "Scope," "Details" and "Delegation" tabs, which are not shown herein to avoid redundancy. For example, this information would identify the location of the group policy object, its ACLs (who can edit it, read it, apply it, and so forth), the version numbers of the group policy object, the GUID, the WMI filter if any and so forth.

The computer configuration section shows the computer configuration settings of a group policy object, and is appended with "(Enabled)" or "(Disabled)" to indicate the status for that portion of the group policy object. The user configuration section shows the user configuration settings of a group policy object, and is appended with either "(Enabled)" or "(Disabled)" to indicate the status for that portion of the group policy object. Note that similar concepts appear as nodes in the GPEdit (navigable left-side) namespace (FIG. 4).

Within the Computer and user configuration sections, subsections in the report are created, having different colors and different indentations. These subsections map relatively well to the prior GPEdit namespace in the MMC. Essentially, each sub-node (and its primary sub-nodes) in MMC such as Software Settings, Windows Settings, Administrative Templates (the first level) maps to a subheading in the HTML report. Note that there are a few exceptions where headings in Html were either omitted or added, namely there is no separate heading in HTML for the "Software Settings" folder shown in MMC, because that folder always only contains one child, "Software Installation," and this avoids redundancy. Also, in the HTML, under the Software Settings section, a header has been added for Assigned and Published applications (which are different ways to deploy applications), in order to group applications by deployment type, which is generally useful but not present in GPEdit. Another exception includes that in the "Computer Configuration\Windows\security" section, subheadings were added under the "Local Policies\Security Options" container. This is because in the MMC user interface there are many (approximately sixty-five) settings, and many of those have names that begin with the same pre-pended text for easy grouping, e.g. several settings begin with "Domain Controller" to discuss settings relevant for domain controllers. In the HTML report, the pre-pended text has been converted into subheadings under the Security Options section.

To map from the various types of data that were able to appear in the right pane in the GPEdit snap-in (e.g., approximately forty-five different user interface layouts existed in MMC GPEdit), various types were identified, with a layout designed for each of the types. The layouts were then represented in HTML using six basic table structures. In other words, the different user interface structures of the GPEdit console were identified and mapped to a table layout usable in HTML. By way of example, one such type of settings was grouped into a simple "administrative templates" category, in which such policy settings may be set to either enabled, disabled, or not configured. Other administrative templates may be more complex, with several sub-settings. Script settings are another type, having a two-column table listing the script name and script parameters. Other settings were much richer, for example Folder Redirection of My Documents is a property page, with multiple tabs.

Figure 6:
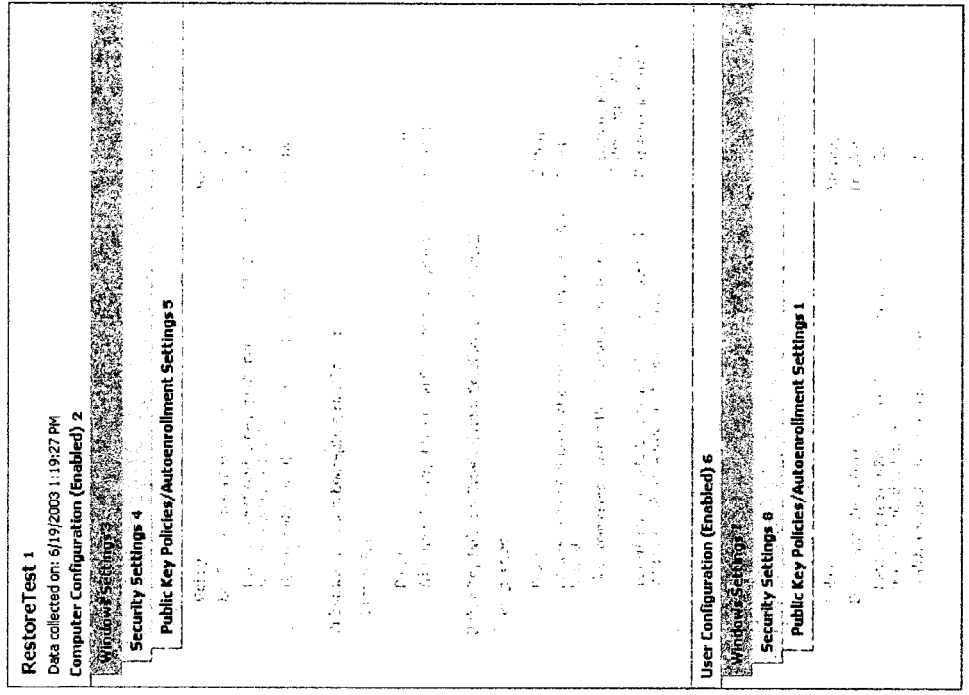

In the implementation described herein, the expand/contract user interface for reporting in the right pane was designed to be analogous to the user interface in the left navigation pane of the GPEdit display. This mapping model was constructed by taking the individual container nodes in the tree and creating a corresponding line header in the report. Based upon the hierarchy in the left navigation pane, indentation and visual contrast were used to denote relationships. FIG. 6 represents, in a side-by-side view of the prior art display (left) versus the reporting display (right) of the present invention, how the high-level containers (buckets) are organized and related, via the numbers 1-9 appearing both to the left of the tree containers and to the right of the descriptive text in the bars of the HTML representation. The following table shows the levels:

1 - Main Context (GPO Name)
2 - Configuration Type (Computer Config)
   3 - 1st level container
   4 - 1st level container
   5 - 1st level container
6 - Configuration Type (User Config)
   7 - 1st level container
   8 - 1st level container
   9 - 1st level container When navigating beyond the high level container nodes in the prior art tree, a mix of both container nodes and end (leaf) nodes are encountered. Container nodes (folder icons) can contain both additional containers and settings pages, while end nodes hold only settings pages. Settings pages (having various icons) are accessed by choosing to view "properties" (synonymous with settings) of that page, which will open a dialog containing those properties. These properties are displayed inline in the reporting user interface of the present invention.

FIG. 7 shows this relationship. When a container holds both containers and Settings pages, the bottom level header can contain a "/" delineated path as a mechanism for articulating the Settings' relationship to the left navigation area. In FIG. 7, consider the Public Key Policies/Autoenrollment Settings (labeled 5 and 8 in the reporting user interface on the right. Since the container Public Key Policies contains bottom level containers and settings, the respective setting or bucket is displayed representative of its relationship to its uplevel node (labeled 5). However, the Public Key Policies/Encrypting File System (labeled 6 on the right) has a representation that is the same as the property page, but is a container node. This container node, although not a property page itself, is a bottom level container which can hold multiple simple settings inside of it. As a result, the node is treated as a de facto property page that shows multiple simple settings in a table view, where the term "Policy" is the header that describes the individual settings.

A substantial part of the reporting mechanism is directed towards representing the actual settings pages beneath the navigable areas, as generally represented in FIG. 8, in which the settings area are generally delimited. Thus, in addition to the report mapping to the left navigation tree area in the GPEdit program, the data in the report maps to the content in the settings pages. Note that a property/settings page is essentially a pop-up dialog which hosts some configurable data, typically accessed by double clicking on a property node, or right-click and selecting "Properties."

Settings pages vary in levels of depth and complexity, such as from simple single-tabbed dialogs having checkboxes, to deep, multi-tabbed and complex dialogs, such as having dropdowns and/or tabs that switch between multiple instances of settings data, e.g., a listing of multiple users and groups, with separate settings (e.g., in checkboxes) maintained for each. Settings pages are built in a relatively modular manner, in which basic structures are combined, through mechanism like tabs, dropdown menus and drilldown buttons to stitch together basic settings into complex settings pages.

In accordance with an aspect of the present invention, individual properties pages are translated into their respective containers in the reporting user interface. Note that settings pages in the GPEdit often vary widely, in practice because settings are often authored by different teams with multiple requirements and differing needs, and then combined together in one GPEdit-based user interface. However, properties page are created using Windows® controls, including (but not limited to) radio buttons, check boxes, drop down lists, combo boxes, edit boxes and static labels, which provides an inherent level of minimal consistency in the creation of settings pages. As will become apparent, most settings pages are straightforward to handle, while others require more complex pages, however using basic rules as templates any page can be represented in the report.

Figures 10, 12:
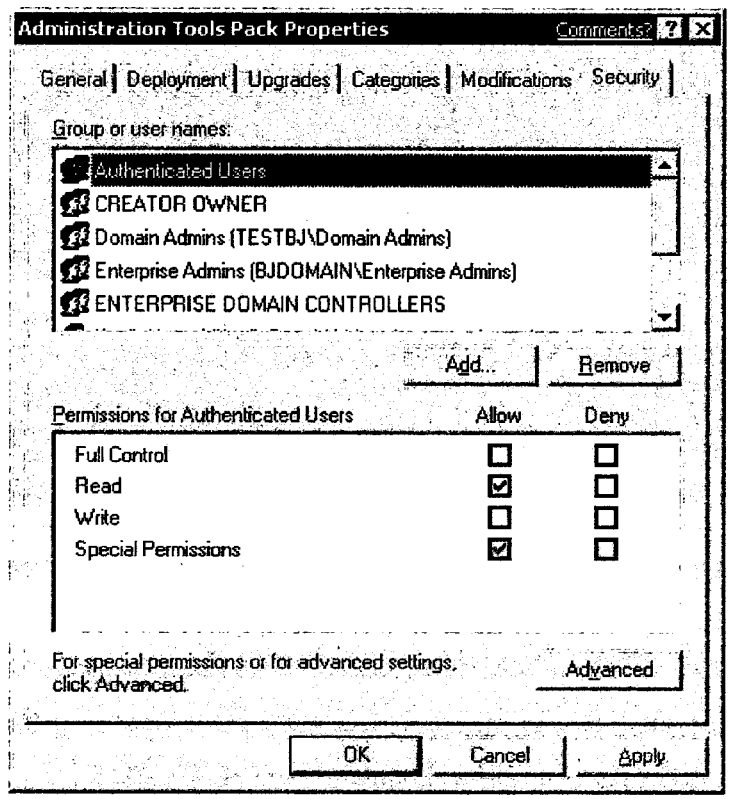

Basic Settings comprise relatively simple configurations that take the form of an enable/disable toggle, along with some data setting that needs configuration after an item is enabled. An example of how such a property dialog as traditionally rendered is represented in the report is represented in FIG. 9, when one basic setting in one container is present. Note that by default, the Group Policy Management Console does not show non-configured settings, and thus there is no need in the report to show these, as in the example of FIG. 9 in which the setting is simply displayed by the term Success. FIG. 10 shows how multiple basic settings in one container are presented.

Figure 11:
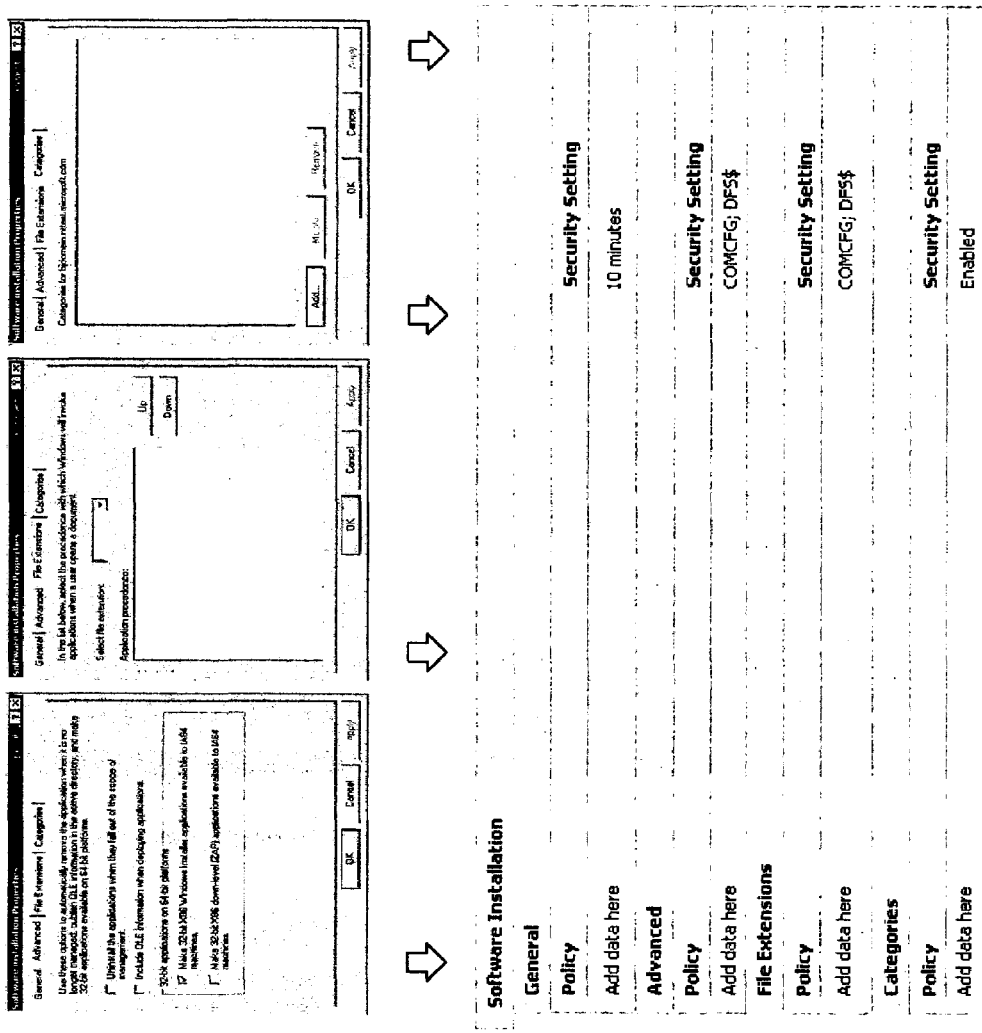
FIG. 11 is an example representation exemplifying the mapping of multiple dialogs to a rendered HTML document in accordance with an aspect of the present invention.

Items can be nested inside of properties pages through multiple mechanisms. These mechanisms may include tabs, drill down buttons, combination boxes, and virtually any other Windows® controls switching mechanism. The present invention displays these changes without losing hierarchy or context. FIG. 11 shows an example of how tab modifying controls are presented in the report. In general, modifying controls are presented by giving the modifying control (the tabs in the example of FIG. 11) a differently colored (e.g., gray) header underneath a navigation header of another color (e.g., blue) to give context and then place the data in the report as normal.

Another contingency that is handled is when nested data is present in the same dialog, e.g., additional setting data is nested inside of a tab structure, either via multiple properties or via drilldown buttons. The prior art dialog shown in FIGS. 12 and 13 represent one such example, in which the "Advanced" button of FIG. 12 is clicked resulting in either the left pop-up dialog or the right pop-up dialog of FIG. 13 being presented, depending on the tab, and having multiple tabs and settings.

Figure 13:
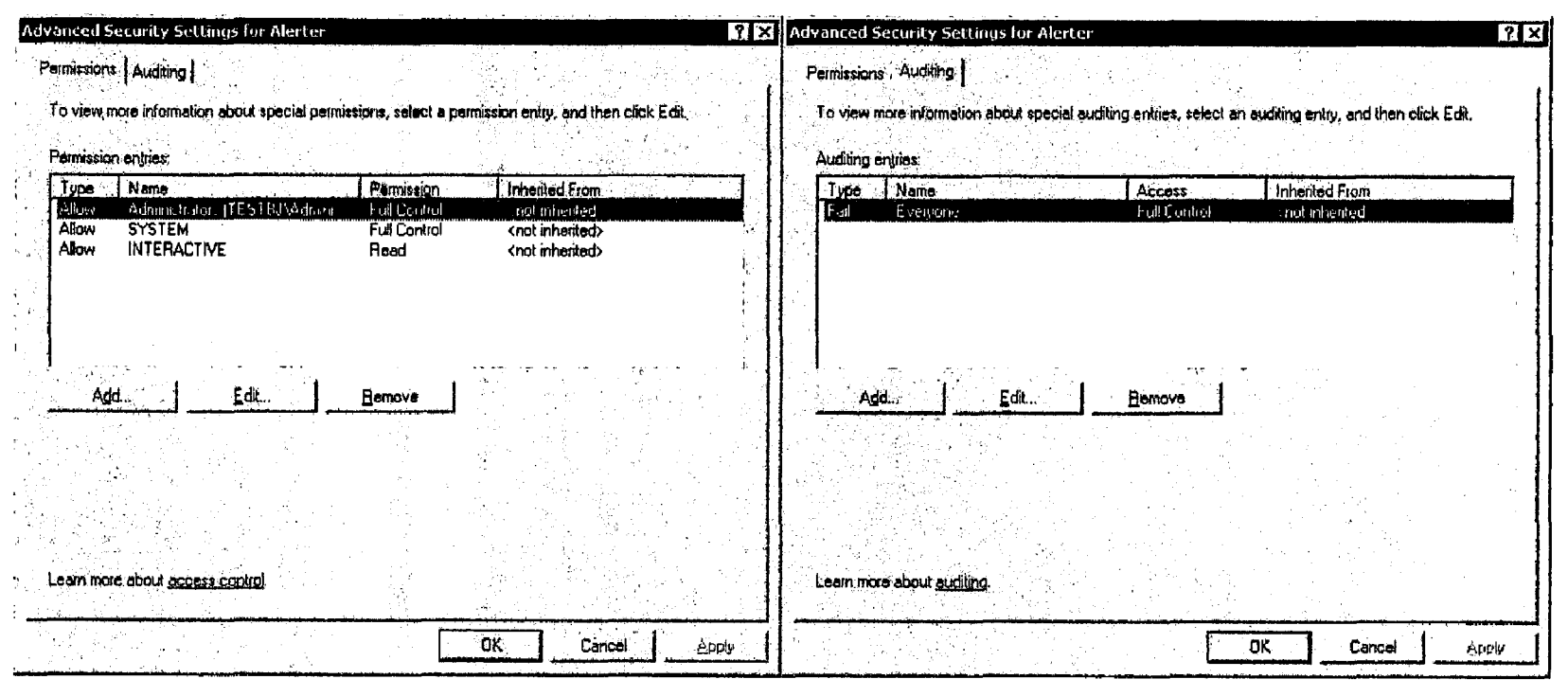

FIG. 14 shows how such nested data in the same dialog is presented in a report (note that the data in FIG. 14 do not correspond to that of FIGS. 12 and 13, however it is seen how multiple layers of settings are displayed in a report). To this end, the leftmost (e.g., blue) bar is the navigational header, and the shaded (e.g., gray) headers underneath the navigational header are the tab names, with the policy is represented underneath each secondary header. Under Network Security, the white (unshaded) boxes provide the grouping mechanism to denote hierarchy in drilldown or multiple properties scenarios in a dialog. The white box contains the properties from the drilldown or multiple properties list.

In this manner, the design is built in a modular manner. As long as precedent is followed, the design model can be implemented as deeply into a tree structure as necessary.

As can be readily appreciated, the Group Policy Management Console reporting mechanism is capable of representing virtually any hierarchical structure having data at leaf nodes, as in the example above wherein the reporting mechanism represents the policy settings configured in a group policy object. Thus, the reporting mechanism can also represent the resultant set of policy (RSoP) settings, in a logging or planning mode WMI namespace, in an HTML document. The HTML document can be viewed from the Group Policy Management Console, or any other suitable HTML rendering component.

Figure 15:
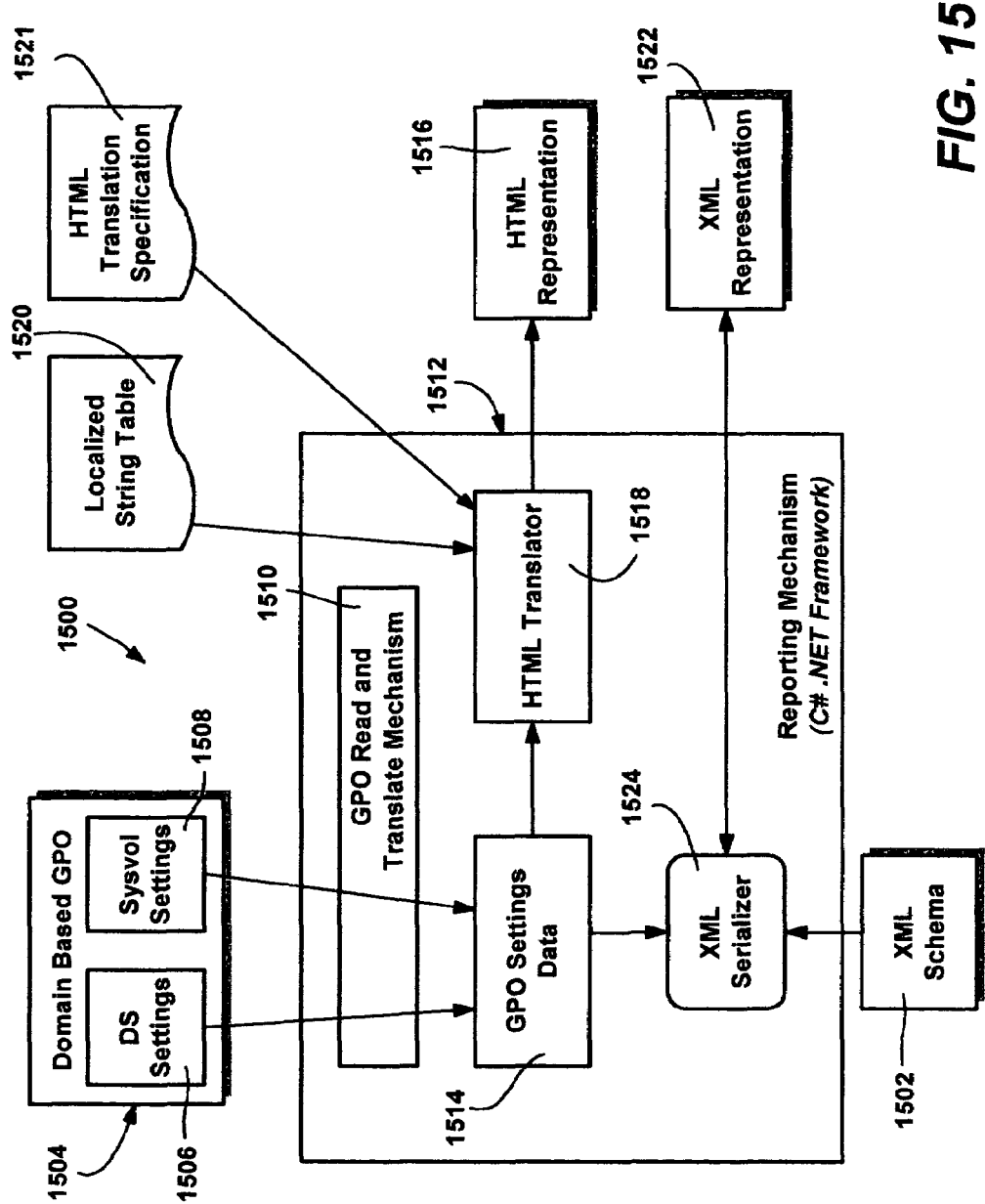
FIG. 15 is a block diagram showing components of a reporting mechanism and the flow of group policy object data to provide markup language report documents in accordance with an aspect of the present invention.

Turning to FIG. 15, there is shown a block diagram of an architecture 1500 configured to collect group policy object settings and output markup language documents based on those settings, in accordance with an aspect of the present invention. In one embodiment, the overall architecture is built on a foundation of .net objects and XML schemas (described below), and is implemented in managed C# code that leverages the .net framework's class libraries and rich XML support. The XML schemas form the foundation, with the setting possibilities for each policy extension described in an XML schema. Around those schemas, an XML schema 1502 for the group policy object and a schema for the RSoP containment objects (described below) are provided.

As described above, the settings for a group policy object 1504 are a combination of directory service settings 1506 and sysvol settings 1508. A GPO read and translate mechanism 1510 in a reporting mechanism 1512 collects these settings group policy object data 1514 that are then processed. To this end, the read and translate mechanism 1512 queries the domain controller and reads the sysvol and Active Directory® for the appropriate settings. The settings in a group policy object are generally stored in one of three possible formats, including DS objects and attributes, .ini style files, and a custom registry.pol binary file for storing ADM settings. Some extensions (e.g. Internet Explorer Maintenance) also store their settings in binary files. These settings are consumed through classes of the .net class library System.DirectoryServices namespace, a shared custom implementation of an .ini file parser, and registry.pol file and ADM file parsers.

To read and translate, a .net object type, in the form of a C# class, is derived from each of the high level schemas. In additional to some type similarities associated with their underlying schemas, the C# policy extension classes implement a common set of inherited methods. One method is an initialization from a group policy object, given the group policy object's directory service and sysvol paths, and corresponds to the GPO read and translate mechanism 1510. Note that another method performs an initialization from an RSoP namespace, as described below with reference to FIG. 16.

Another set of classes persists the class into an HTML representation 1516, as generally described above, comprising code which conceptually writes out large sections of static HTML text interspersed with data inserted from the fields of the class. This is represented in FIG. 15 by the HTML translator 1518. Note that the HTML translator can use a localized string table 1520 to render the GPO's HTML representation 1516 output in an appropriate language. The HTML translation specification 1521 essentially represents the mapping mechanism (the method of converting hierarchical data to HTML) described above with reference to FIGS. 5-13.

In addition to presenting the information to a user via HTML, the present invention is also able to persist the information to an XML document/representation 1522. Note that no method needs to be implemented for persisting the classes into XML, as this functionality is provided via an XML serializer class 1524 already available in the .NET framework class libraries. Any .net managed class can be serialized to XML. In the .net framework, class serialization to XML comprises a conversion of each public field in a class to an XML element. To leverage this, the designs of the .net class objects include public class fields for each of the elements to write in the XML instance documents. Note that the framework software development kit includes a tool, xsd.exe, which takes an XML schema as input and outputs C# classes and enumeration which represent the complexTypes and simpleTypes in the schema. Once constructor or initialization methods are written for these classes, there is no further work needed to serialize the classes to XML, as the integrated xml support allows us to completely avoid any of the DOM based xml programming that would have otherwise been needed to construct these instance documents.

As represented in FIG. 15, the reporting mechanism 1512 and its functionality thus may be implemented in a single .net assembly, and can be invoked directly from other managed code. The assembly may be registered for COM interoperability. The .net assembly enables the mechanism 1510 to be invoked from the implementation of the IGPMRSoP and IGPMGPO interfaces of the Group Policy Management Console API set, (described in the aforementioned patent application Ser. No. 10/411,876). Consumers of the Group Policy Management Console interfaces (such as scripts and the internal Group Policy Management Console user interface may remain contained within an existing COM-based interface design.

The API model for invoking the reporting functionality remains part of the overall GPMC COM base interfaces. Both the IGPMRSoP and IGMGPO interfaces implement GenerateReport methods which can be used for generated the xml and/or html documents from either an RSoP namespace or a single group policy object. Another interface, IGPMBackup, also implements the GenerateReport method to generate reports for backed up group policy objects, that is, the HTML report may be generated from an XML report persisted with a group policy object backup. Internally these methods invoke the reporting mechanism (the .net assembly) via unmanaged to managed COM interop interfaces.

Note that the .net objects exposed by the assembly can be invoked outside the scope of the GPMC COM interfaces. Only the GPO and RSoP classes of the assembly are registered for unmanaged COM interop.

Figure 16:
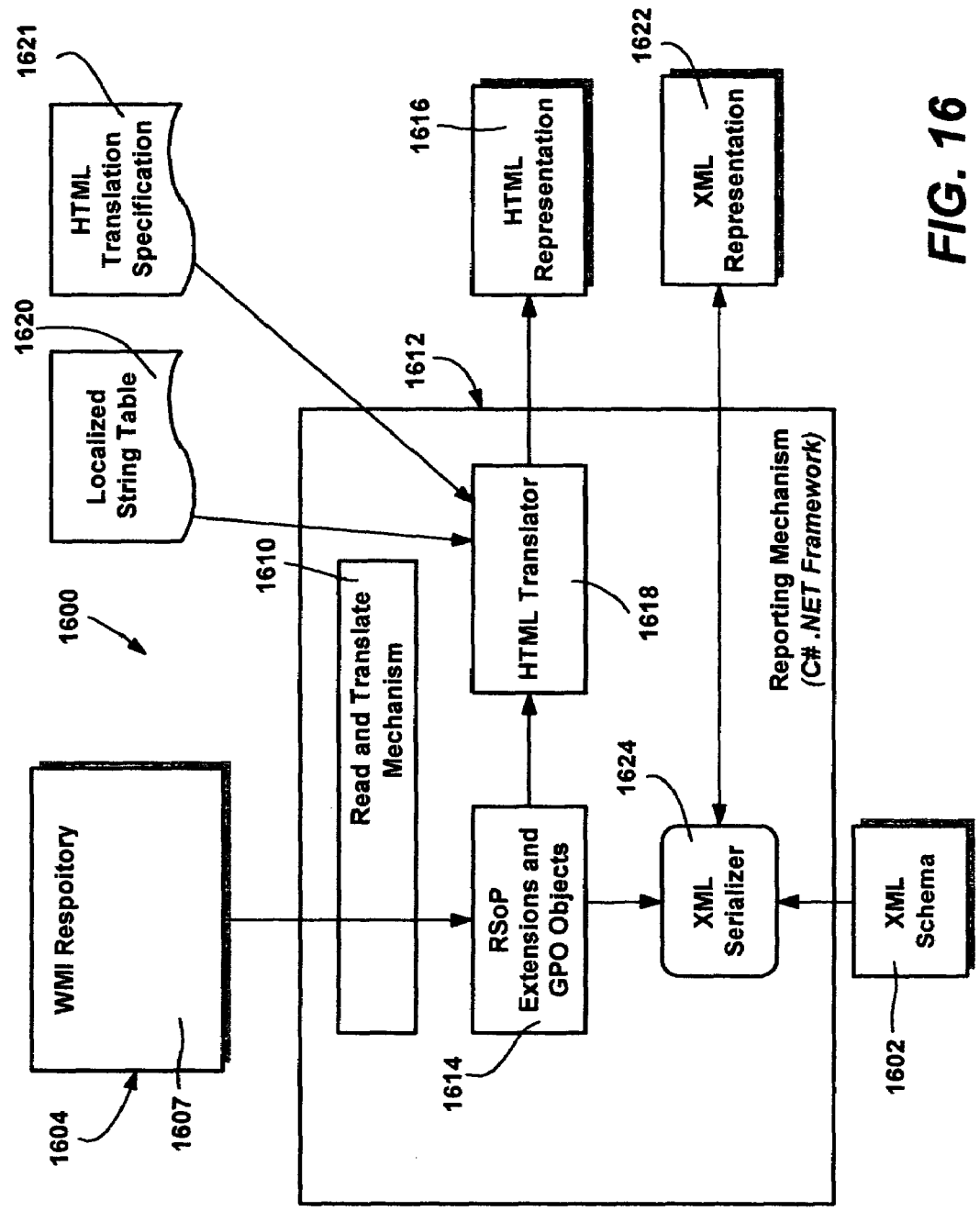
FIG. 16 is a block diagram showing components of a reporting mechanism and the flow of resultant set of policy (RSoP) data to provide markup language report documents in accordance with an aspect of the present invention.

Turning to FIG. 16, there is shown a similar representation by which RSoP settings 1607 are consumed, by initializing the various .net class objects from a WMI namespace 1604 using classes from the .net class library System.Management namespace.

The RSoP data is slightly different from the GPO data. For example, the group policy object report contains some general information about the group policy object, including its identifier, the last time it was modified, and so forth which is not applicable in the RSoP case. Instead, RSoP reports have their own general information, such as the user or computer for which the data was logged or simulated, the set of GPOs that apply to the target, the set of security groups to which the target belongs, and so forth. This general data is specific to RSoP reports.

The settings data are very similar for both group policy object and RSoP reports. One distinction is that the RSoP report will give the "winning group policy object" for a particular setting, that is, the group policy object from which that setting came and which overrode other group policy objects. In addition, there are some (relatively rare) cases where the RSoP data for a setting contains more information than the group policy object data for the same setting. This is true of scripts settings, where in the group policy object case, there is only have the script name and parameters, but in the RSoP logging case, there is the name and parameters, as well as the time the script was last executed on the target.

The overall flow of data through the architectures 1500 and 1600 is relatively straightforward and direct, as for GPOs, the GPO read and translate mechanism 1510 (the .net class objects) read the group policy object settings 1514 directly from the DS and sysvol components of the group policy object. For RSoP settings, the RSoP read and translate mechanism 1610 (another method of the .net class objects) reads the RSoP settings 1607 from a WMI namespace 1604. Once the classes have been initialized, an XML document which conforms to the corresponding GPO schema 1502 or RSoP schema 1602, as appropriate, may be produced by utilizing the XmlSerializer class (1524 or 1624 in FIGS. 15 and 16, respectively) of the .net class library. For generating HTML documents, the group policy object and RSoP root elements, as well as each extension, implement an appropriate method for persisting their settings into the statically defined HTML format, as generally represented by the HTML translator 1518 and the HTML translator 1618, described above.

In general, the schema design provides an implementation and testing framework and blueprint, while also enabling some level of enforcement of valid XML documents. Generated XML documents need to be valid against these defined schemas, providing a first level of internal verification Group policy objects and RSoPs are two possible root element types in generated XML documents. A document produced from a group policy object begins with the <gpo> root element and a document produced from an RSoP namespace begins with the <RSoP> root element.

The overall layout of a group policy object along with its actual schema is set forth below:

| GPO type | | |
|---|---|---|
| Element Name | XSD Type | Notes |
| Name | string | |
| Identifier | GUID | restricted string type |
| Domain | DomainPath | restricted string type |
| CreatedTime | dateTime | |
| ModifiedTime | dateTime | |
| SecurityDescriptor | string | |
| Computer | Custom type | Computer settings |
| User | Custom type | User settings |
| LinksTo | Custom type | SOMs with links to the GPO |

```
<?xml version="1.0" encoding="utf-8" ?>
<!-- Copyright (c) Microsoft Corporation. All rights reserved. -->
<xs:schema targetNamespace="http://www.microsoft.com/GroupPolicy/Settings"
xmlns:gp="http://www.microsoft.com/GroupPolicy/Settings"
xmlns:gpbase="http://www.microsoft.com/GroupPolicy/Settings/Base"
xmlns:types="http://www.microsoft.com/GroupPolicy/Types"
xmlns:sd="http://www.microsoft.com/GroupPolicy/Types/Security" xmlns:xs="http://www.w3.org/2001/XMLSchema"
elementFormDefault="qualified">
    <!--
    GPO.xsd
    The schema for representing Group Policy settings. This is currently not used natively for applying settings.
    This represents a mapping of these settings from their native format in a Windows Active Directory
environment.
    -->
    <xs:import namespace="http://www.microsoft.com/GroupPolicy/Settings/Base" />
    <!-- Our root element. -->
    <xs:element name="GPO" type="gp:GPO" />
    <!--
        The GPO type description
    -->
    <xs:complexType name="GPO">
        <xs:sequence>
            <!-- Global information for the GPO -->
            <xs:element name="Identifier" type= "types:GPOIdentifier" />
            <xs:element name="Name" type="xs:string" minOccurs="0" />
            <xs:element name="CreatedTime" type="xs:dateTime" />
            <xs:element name="ModifiedTime" type="xs:dateTime" />
            <xs:element name="ReadTime" type="xs:dateTime" />
            <xs:element name="SecurityDescriptor" type="sd:SecurityDescriptor" />
            <xs:element name="FilterDataAvailable" type="xs:boolean" />
            <xs:element name="FilterName" type="xs:string" minOccurs="0" />
            <xs:element name="FilterDescription" type="xs:string" minOccurs="0" />
            <!-- Computer specific configuration -->
            <xs:element name="Computer" type="gp:GPOUserOrComputerConfig" />
            <!-- User specific configuration -->
            <xs:element name="User" type="gp:GPOUserOrComputerConfig" />
            <!-- LinksTo is related to, but not an attribute of a GPO, so it is made optional -->
            <xs:element name="LinksTo" type="gp:GPOLink" minOccurs="0" maxOccurs="unbounded" />
        </xs:sequence>
```

```
        </xs:complexType>
        <!--
            These are settings which apply to each of the user & computer portions of a GPO.
        -->
        <xs:complexType name="GPOUserOrComputerConfig">
            <xs:sequence>
                <xs:element name="VersionDirectory" type="xs:unsignedShort" /> <!-- the GPC version -->
                <xs:element name="VersionSysvol" type="xs:unsignedShort" /> <!-- the GPT version -->
                <xs:element name="Enabled" type="xs:boolean" />
                <xs:element name="ExtensionData" type="gp:GPOExtensionData" minOccurs="0"
maxOccurs="unbounded" />
            </xs:sequence>
        </xs:complexType>
        <xs:complexType name="GPOExtensionData">
            <xs:sequence>
                <xs:element name="Error" type="gp:ErrorDetails" minOccurs="0" maxOccurs="unbounded" />
                <xs:element name="Extension" type="gp:GPOExtension" minOccurs="0" />
                <xs:element name="Name" type="xs:string" minOccurs="0" />
            </xs:sequence>
        </xs:complexType>
        <xs:complexType name="ErrorDetails">
            <xs:sequence>
                <xs:element name="Source" type="xs:string" minOccurs="0" />
                <!-- Can be a property, line number etc. -->
                <xs:element name="Details" type="xs:string" minOccurs="0" />
                <xs:element name="Error" type="xs:unsignedInt" minOccurs="0" />
                <xs:element name="Description" type="xs:string" />
            </xs:sequence>
        </xs:complexType>
        <xs:complexType name="GPOExtension" abstract="true">
            <xs:sequence>
                <!-- This is intentionally empty. All other extensions substitute it. -->
            </xs:sequence>
        </xs:complexType>
        <!--
            GPOLink describes scopes of management which have a link to a GPO.
        -->
        <xs:complexType name="GPOLink">
            <xs:sequence>
                <xs:element name="SOMName" type="xs:string" />
                <xs:element name="SOMPath" type="types:SOMPath" />
                <xs:element name="Enabled" type="xs:boolean" />
                <xs:element name="NoOverride" type="xs:boolean" />
            </xs:sequence>
        </xs:complexType>
</xs:schema>
```

The type defined for computer and user settings is the same, and acts as the container for the actual settings defined on those portions of a group policy object:

| Computer and User settings type | |
|---|---|
| Element Name | XSD Type |
| VersionDirectory | short |
| VersionSysvol | short |
| Enabled | boolean |
| ExtensionSettings | Custom type |

The ExtensionsSettings type is an abstract type which simply contains a Name element and which policy extension schemas derive from.

Policy extension types derive from the abstract GPOExtension type. Each policy extension type comprises elements of types inherited from another abstract type SettingBase_at, and represents a unit that can be individually configured in a group policy object. The policy extension types as well as their detailed settings types define the elements which are used in both group policy object and RSoP XML documents. The instances of these elements in these two situations are common enough that optional elements are used where needed for RSoP attributes, rather than defining separate derived types.

The base abstract setting type SettingBase_at contains an optional group policy object and an optional Precedence element. These two elements are utilized when the setting type is utilized to instantiate RSoP settings. Thus for the purpose of just representing settings within a single group policy object, the SettingBase_at is irrelevant, however it does serve to form a base of commonality for how extension schemas are formulated.

Thus each extension schema is factored as a new complexType derived from GPOExtension. Each top level element of this type is then of a type which derives from SettingBase_at. To illustrate this, a simple schema for the scripts extension top level type and setting type is included below:

```xml
<?xml version="1.0" encoding="utf-8" ?>
<!-- Copyright (c) Microsoft Corporation. All rights reserved. -->
<xs:schema targetNamespace="http://www.microsoft.com/GroupPolicy/Settings/Scripts"
    xmlns:scripts="http://www.microsoft.com/GroupPolicy/Settings/Scripts"
    xmlns:gp="http://www.microsoft.com/GroupPolicy/Settings"
    xmlns:gpbase="http://www.microsoft.com/GroupPolicy/Settings/Base"
    xmlns:xs="http://www.w3.org/2001/XMLSchema" elementFormDefault="qualified">
    <xs:import namespace="http://www.microsoft.com/GroupPolicy/Settings" />
    <!--
        scripts.xsd
        Group policy scripts extension.
    -->
    <xs:element name="Scripts" type="scripts:Scripts" />
    <xs:complexType name="Scripts">
        <xs:complexContent>
            <xs:extension base="gp:GPOExtension">
                <xs:sequence minOccurs="0" maxOccurs="unbounded">
                    <xs:element name="Script" type="scripts:ScriptSetting" />
                </xs:sequence>
            </xs:extension>
        </xs:complexContent>
    </xs:complexType>
    <xs:complexType name="ScriptSetting">
        <xs:complexContent>
            <xs:extension base="gpbase:SettingBase_at">
                <xs:sequence>
                    <xs:element name="Command" type="xs:string" />
                    <xs:element name="Parameters" type="xs:string" minOccurs="0" />
                    <xs:element name="Type" type="scripts:Type" />
                    <xs:element name="Order" type="xs:unsignedint" />
                    <!-- RSoP -->
                    <xs:element name="ExecutionTime" type="xs:dateTime" minOccurs="0" />
                </xs:sequence>
            </xs:extension>
        </xs:complexContent>
    </xs:complexType>
    <xs:simpleType name="Type">
        <xs:restriction base="xs:string">
            <xs:enumeration value="Logon" />
            <xs:enumeration value="Logoff" />
            <xs:enumeration value="Startup" />
            <xs:enumeration value="Shutdown" />
        </xs:restriction>
    </xs:simpleType>
</xs:schema>
```

Figure 17:
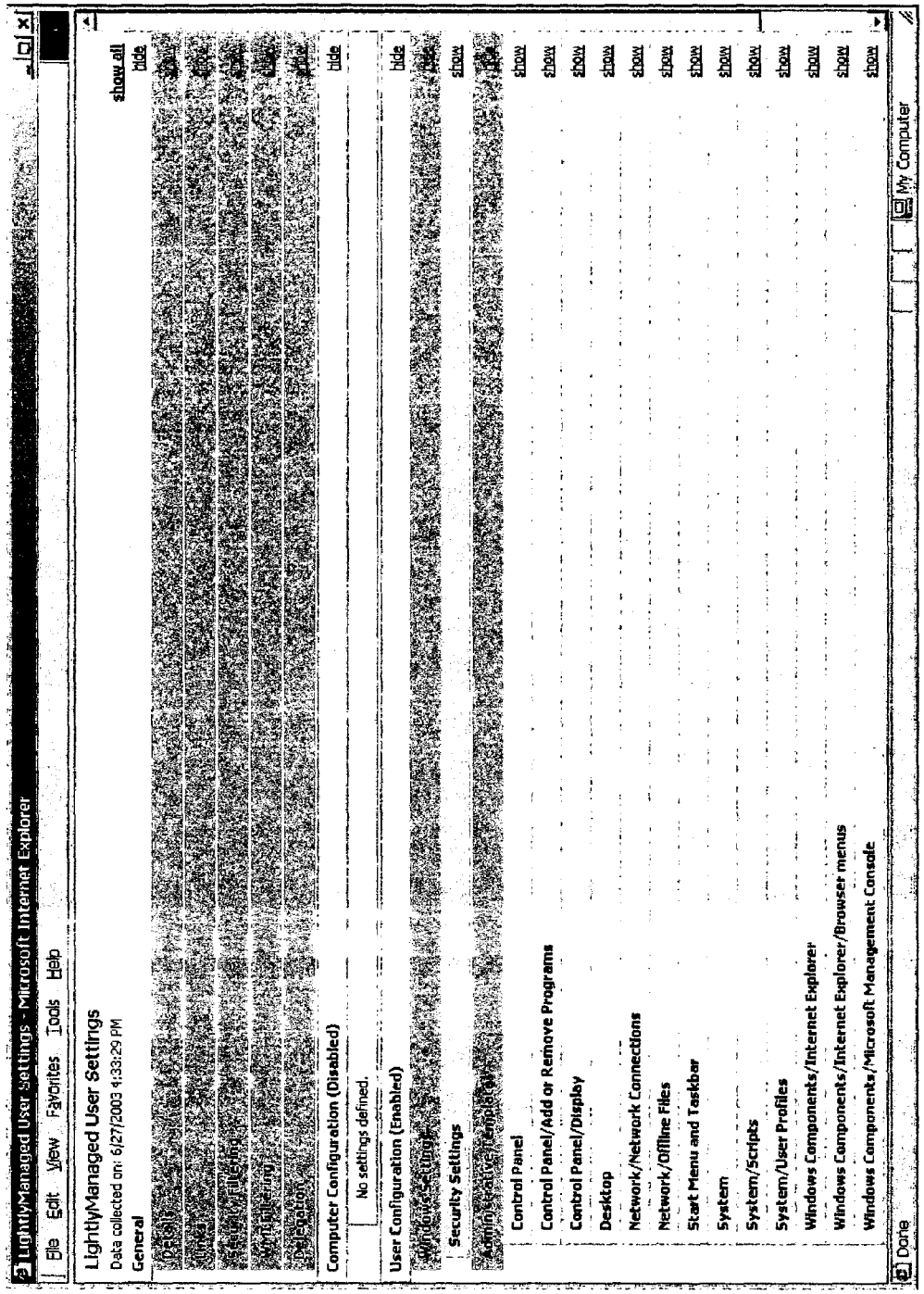
FIGS. 17 and 18 are example representations of a rendered HTML document showing settings displayed for a user and computer, respectively, in accordance with an aspect of the present invention.
Figure 18:
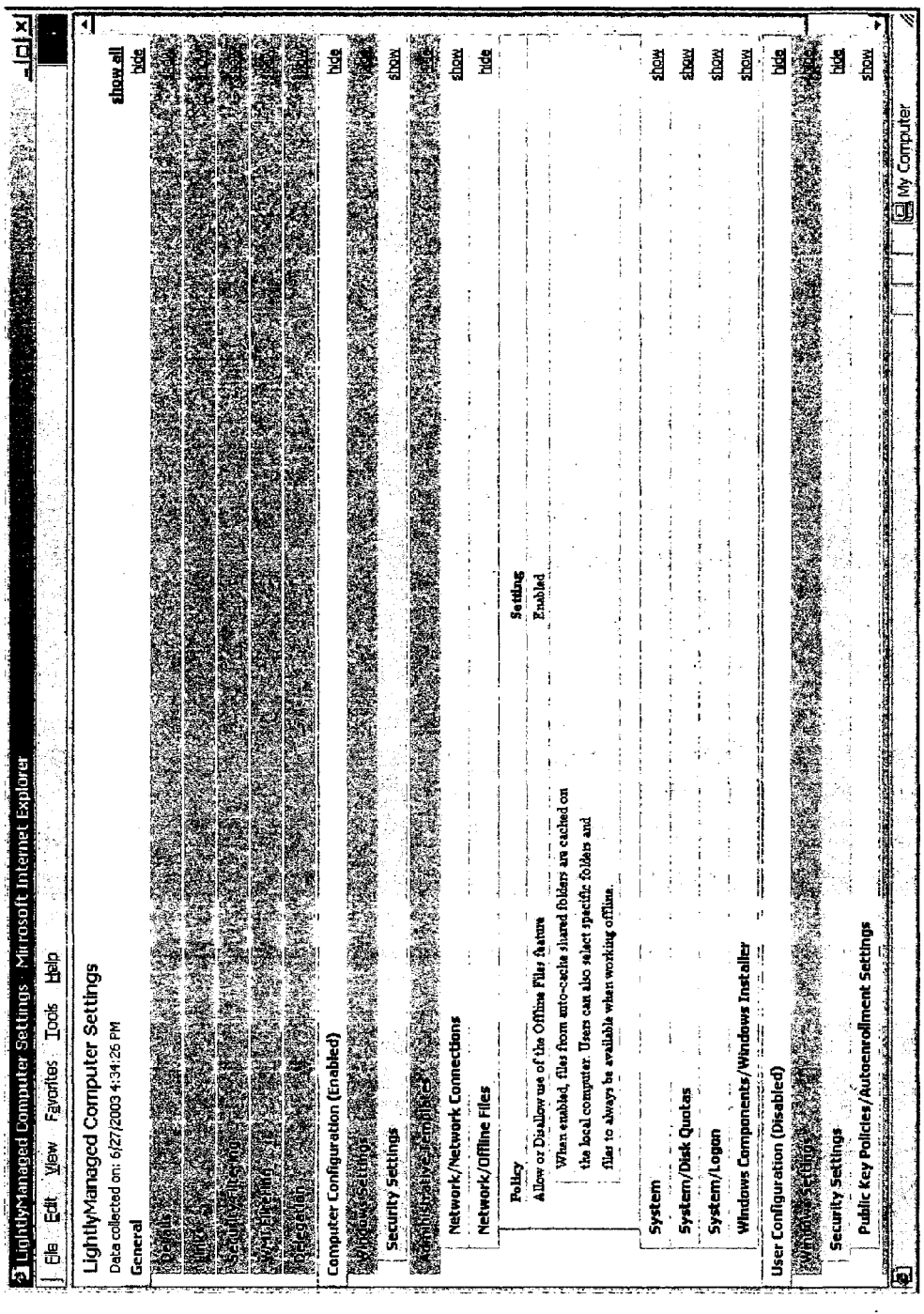

Appendixes A and B are representations of sample HTML and an XML schema, respectively, for an example group policy object for a user. The HTML of Appendix A, when rendered, corresponds to FIG. 17. FIG. 18 shows a group policy object for computer settings when other example HTML, translated in accordance with an aspect of the present invention, is rendered.

Figure 19:
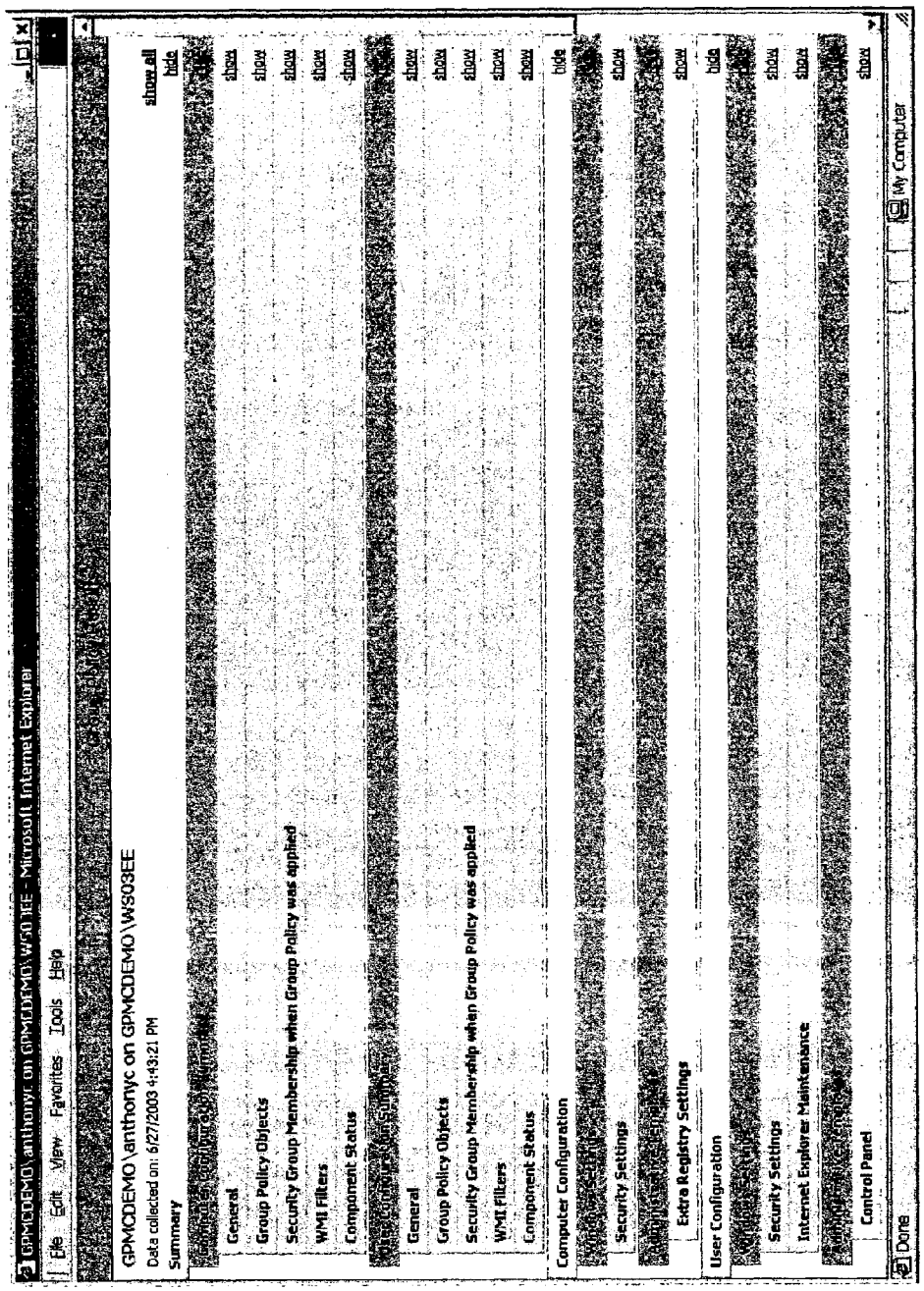
FIG. 19 is an example representation of a rendered HTML document showing a resultant set of policy (RSoP) settings report, in accordance with an aspect of the present invention.

Appendixes C and D are representations of sample HTML and an XML schema, respectively for a Resultant Set of Policy. The HTML, when rendered, corresponds to FIG. 19.

As can be seen from the foregoing detailed description, there is provided a method and system for reporting hierarchical data by outputting markup language documents from a collection of hierarchically maintained settings, such as group policy object settings or resultant set of policy settings. The markup language format enables viewing a flat representation of the settings, and printing, saving and/or transporting of the settings, consistent with XML schemas that describe a valid representation of group policy settings, and a valid representation of resultant set of policy. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
    identifying a first group policy object including a first plurality of settings and a second plurality of settings, the first plurality of settings being configured and applied to a computing environment and the second plurality of settings not configured and applied to a computing environment;
    identifying a second group policy object including a third plurality of settings and a fourth plurality of settings, the third plurality of settings being configured and applied to a computing environment and the fourth plurality of settings not configured and applied to a computing environment;
    collecting the first subset of settings from the first group policy object applied to a first scope of management;
    collecting the third subset of settings from the second group policy object applied to a second scope of management;

combining the first subset of settings and the third subset of settings into at least one markup language document according to a predefined schema;

displaying a report created from the markup language document, the displayed report containing only settings configured and applied to a computing environment.

2. The method of claim 1 wherein a first setting from the first group policy object conflicts with a second setting from the second group policy object, the method further comprising:

resolving the conflict to determine whether the first setting or the second setting is a prevailing setting; and identifying the prevailing setting in the displayed report.

3. The method of claim 1 wherein the first scope of management and the second scope of management further comprises one of the following: a site; a domain; an organization unit.

4. The method of claim 1 wherein combining the settings into at least one markup language document comprises generating an HTML-formatted document and the displaying a report further comprises displaying the HTML-formatted document.

5. The method of claim 1 wherein combining the settings into at least one markup language document further comprises serializing settings data into an XML-formatted document.

6. The method of claim 5 wherein serializing settings data further comprises providing an XML schema and settings data to an XML serializer component.

7. A computer-readable storage medium having computer-executable instructions for performing the method of claim 1.

8. The method of claim 1 wherein the step of collecting settings from the first group policy object includes collecting directory service settings and the step of collecting settings from a second group policy object includes collecting system volume settings, the method further comprising:

querying a domain controller;

reading the directory service settings and the system volume settings from the domain controller based on the querying.

9. The method of claim 8 further comprising storing the directory service settings and the system volume settings, wherein the directory service settings and the system volume settings are stored in a format selected from the group consisting of Directory Service (DS) objects/attributes, .ini style files, and a custom registry.pol binary file.

10. The method of claim 1 wherein the combining step includes deriving an object type from the collected settings from the first group policy object and the second group policy object, the derived object type being in the form of a C# class implementing a common set of inherited methods.

11. The method of claim 10 wherein the common set of inherited methods includes initialization from a group policy object based on a directory service and file system directory (sysvol) path of a group policy object.

12. The method of claim 11 wherein the common set of inherited methods includes an initialization from a resultant set of policy (RSoP) namespace.

13. The method of claim 1 wherein the combining step further comprises
writing out HTML text corresponding to the combined settings based on a localized string table and an HTML translation specification, wherein the HTML translation specification defines a method for converting data to HTML.

14. The method of claim 13 further comprising persisting the combined settings to an XML representation, the persisting including serializing a managed class to XML and converting a public field to an XML element.

15. The method of claim 1 further comprising:

displaying a list of group policy objects; and receiving a selection of a group policy object from the list of group policy objects, wherein collecting settings from the first and second group policy objects and combining the settings is responsive to the received selection.

16. The method of claim 15 wherein the displayed report corresponds to the selected group policy object, displaying the list of group policy objects includes displaying the list of group policy objects at a first location on a display, and displaying the report includes displaying the report at a second location on the display, the first location being non-overlapping with the second location.

17. The method of claim 16 wherein displaying the report is simultaneous with displaying the list of group policy objects.

* * * * *